United States Patent
Lee et al.

(10) Patent No.: US 12,003,277 B2
(45) Date of Patent: Jun. 4, 2024

(54) METHOD FOR TRANSMITTING OR RECEIVING SIGNAL IN LOW-BIT QUANTIZATION SYSTEM AND DEVICE THEREFOR

(71) Applicant: LG ELECTRONICS INC., Seoul (KR)

(72) Inventors: Sangrim Lee, Seoul (KR); Byounghoon Kim, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 17/637,420

(22) PCT Filed: Aug. 20, 2019

(86) PCT No.: PCT/KR2019/010566
§ 371 (c)(1),
(2) Date: Feb. 22, 2022

(87) PCT Pub. No.: WO2021/033797
PCT Pub. Date: Feb. 25, 2021

(65) Prior Publication Data
US 2022/0278755 A1    Sep. 1, 2022

(51) Int. Cl.
*H04B 10/556*    (2013.01)
*G06N 3/049*    (2023.01)
(Continued)

(52) U.S. Cl.
CPC ......... *H04B 10/5561* (2013.01); *G06N 3/049* (2013.01); *H04B 10/677* (2013.01); *H04L 27/233* (2013.01)

(58) Field of Classification Search
None
See application file for complete search history.

(56) References Cited

U.S. PATENT DOCUMENTS

2004/0129478 A1*  7/2004  Breed .................... B60R 22/20
                                                            180/273
2014/0357312 A1* 12/2014  Davis .................... H04N 23/70
                                                            455/550.1
(Continued)

FOREIGN PATENT DOCUMENTS

CN           108650201           10/2018

OTHER PUBLICATIONS

Gruber, et al., "On Deep Learning-Based Channel Decoding", 2017 51st Annual Conference on Information Sciences and Systems (CISS), May 2017, 6 pages.
(Continued)

*Primary Examiner* — Darren E Wolf
(74) *Attorney, Agent, or Firm* — LEE, HONG, DEGERMAN, KANG & WAIMEY

(57) ABSTRACT

The present disclosure relates to a method for transmitting or receiving a signal by a reception device in a wireless communication system, and the method may comprise the steps of: receiving, from a transmission device, a signal modulated on the basis of a differential phase shift keying (DPSK) scheme; converting the received signal into an input signal of a spiking neural network (SNN); calculating an output value through the spiking neural network previously learned; and converting the output value into an input signal of a channel decoder.

11 Claims, 18 Drawing Sheets

(51) Int. Cl.
    *H04B 10/67*         (2013.01)
    *H04L 27/233*      (2006.01)

(56) References Cited

U.S. PATENT DOCUMENTS

2017/0163337 A1*   6/2017   Djukic ................ H04B 10/079
2017/0230675 A1    8/2017   Wierstra et al.
2020/0204299 A1*   6/2020   Bennatan .......... H03M 13/6597

OTHER PUBLICATIONS

Chen, et al, "Artificial Neural Networks—Based Machine Learning for Wireless Networks: A Tutorial", IEEE Communications Survey & Tutorials, vol. 21, Jul. 2019, 33 pages.
Zamani, et al., "A Bidirectional Associative Memory Based On Cortical Spiking Neurons Using Temporal Coding", Ryerson University, Computer Science, Jan. 2009, 87 pages.
PCT International Application No. PCT/KR2019/010566, International Search Report dated May 20, 2020, 4 pages.

* cited by examiner

[FIG. 1]
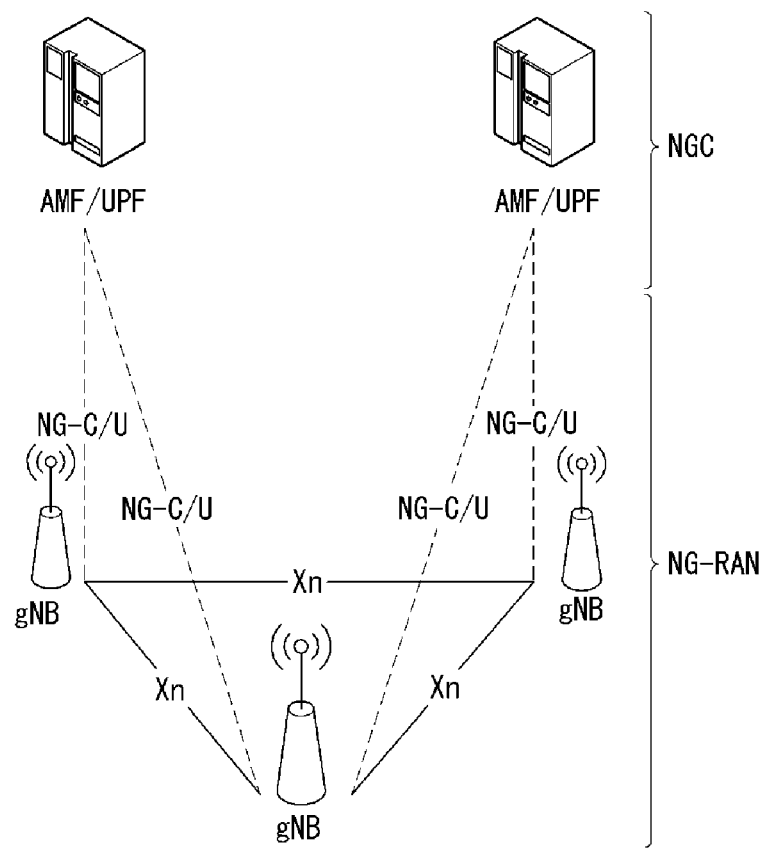
[FIG. 2]
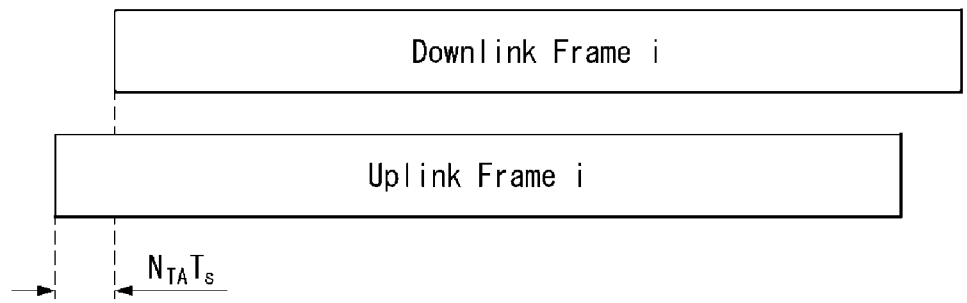

[FIG. 3]
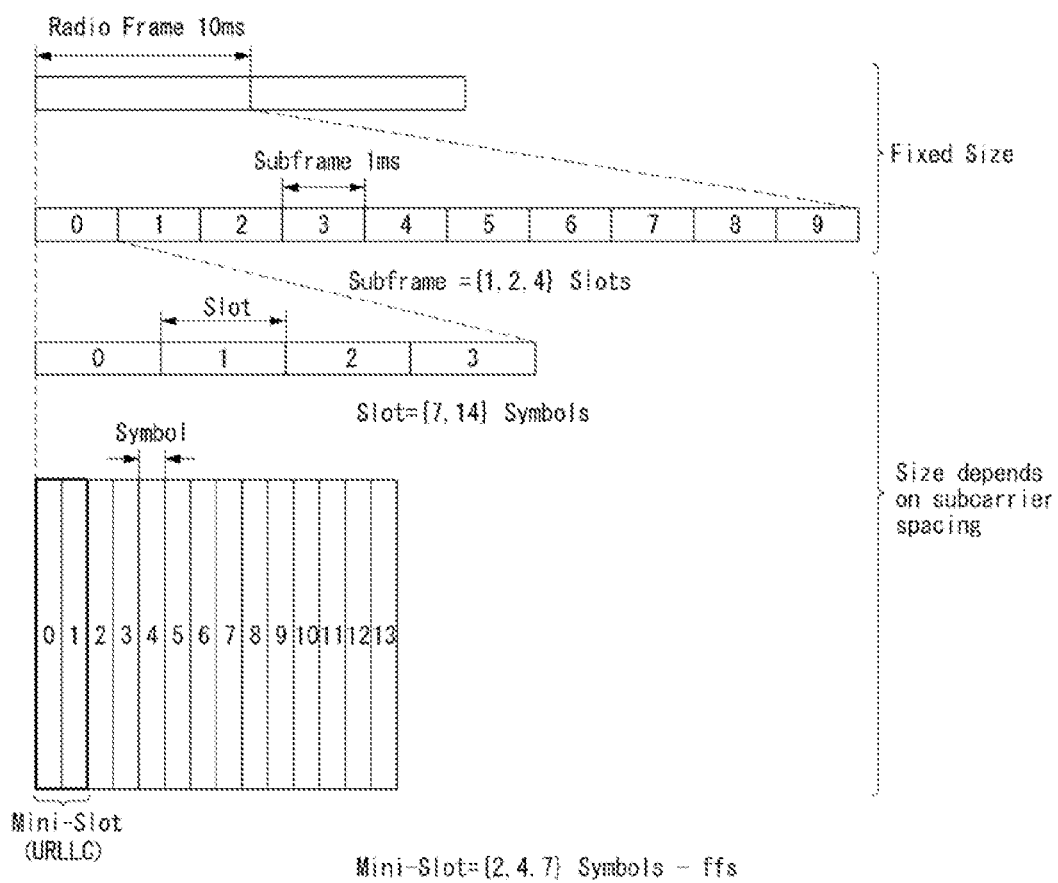

[FIG. 4]
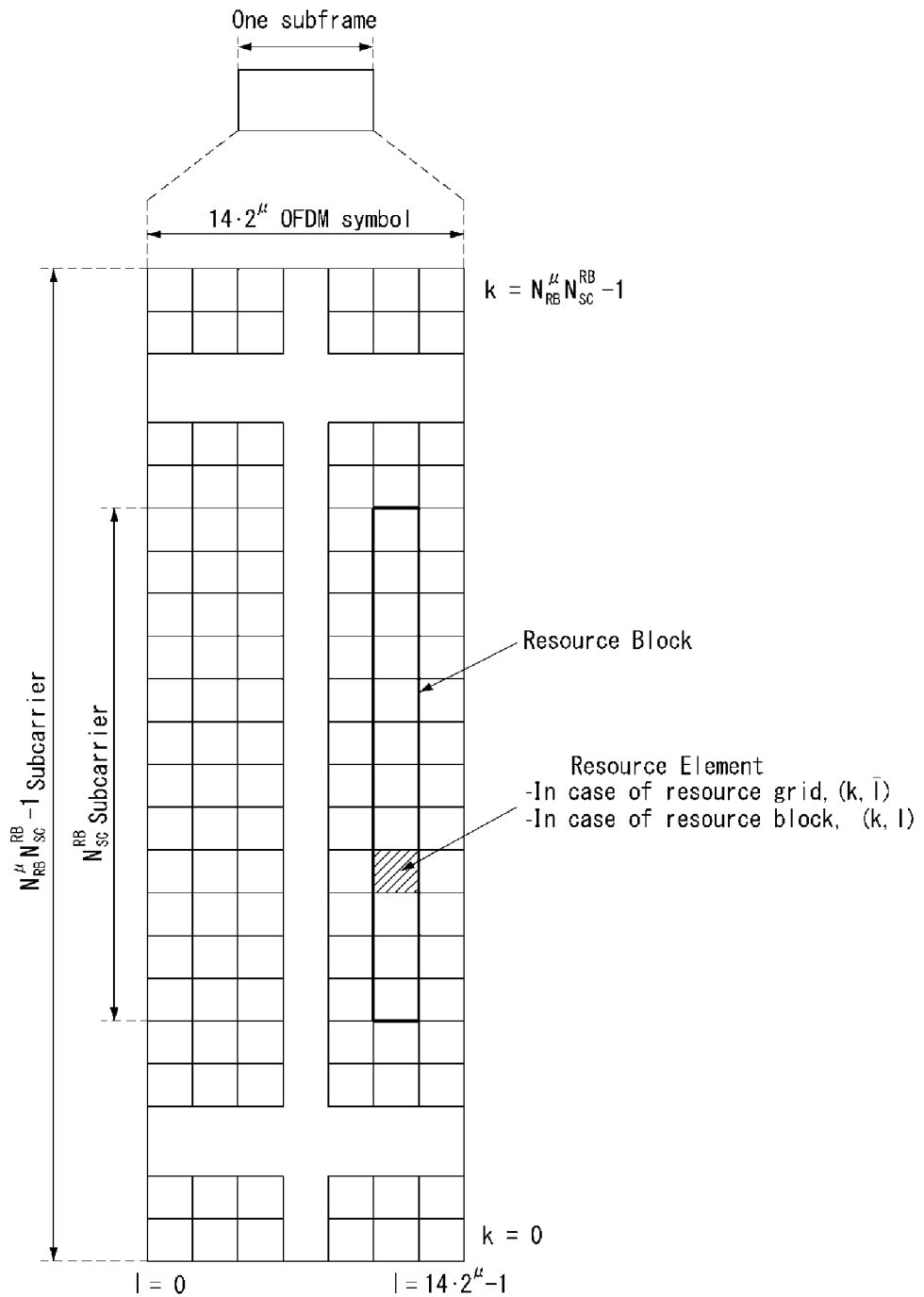

[FIG. 5]
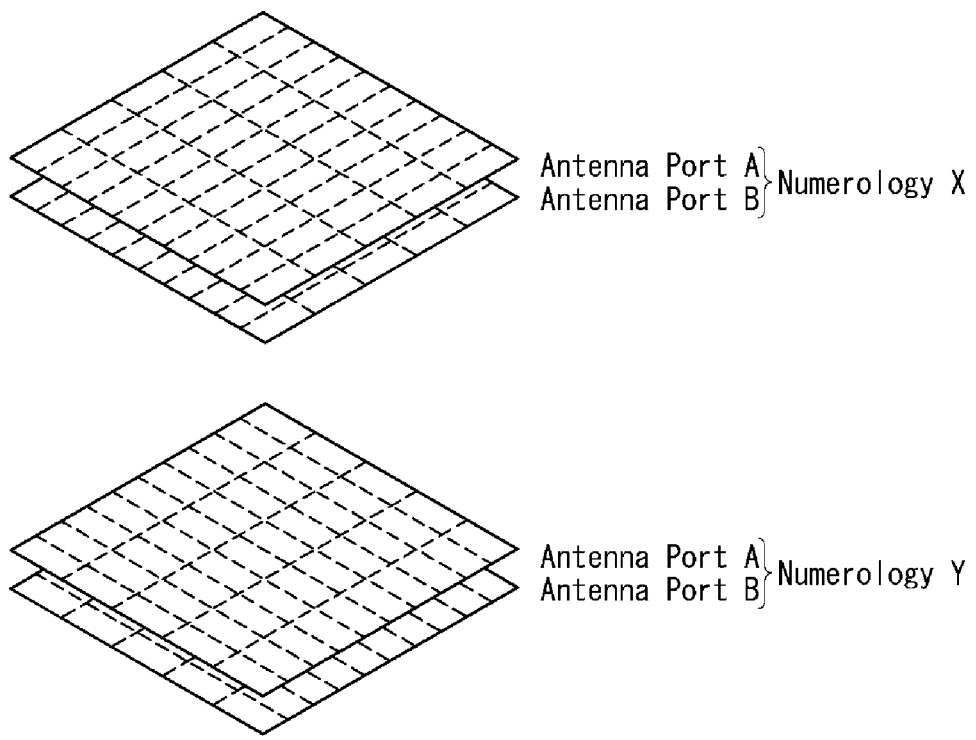

[FIG. 6]
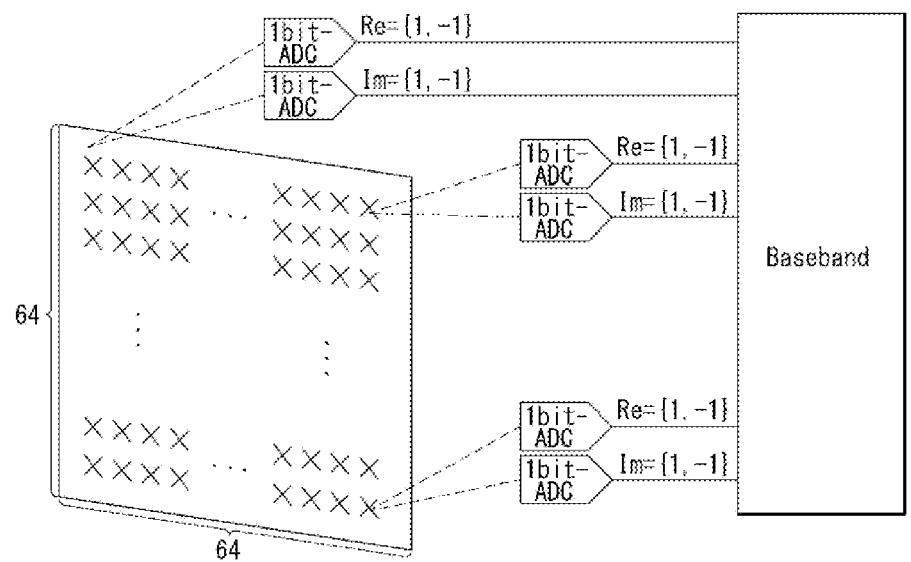
[FIG. 7]
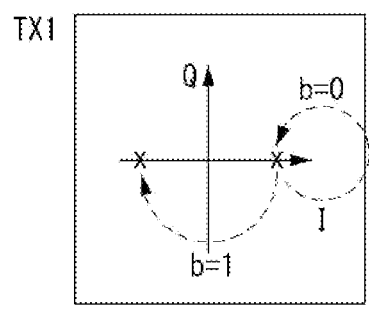

[FIG. 8]
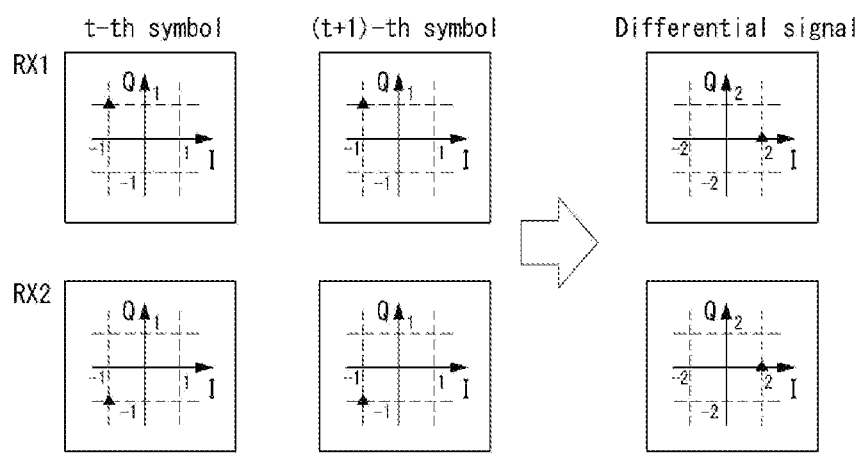
[FIG. 9]
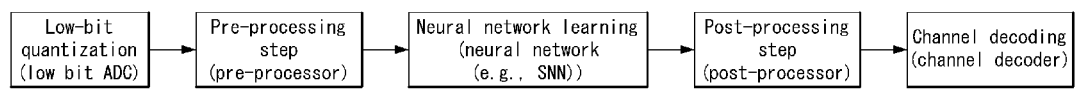

[FIG. 10]
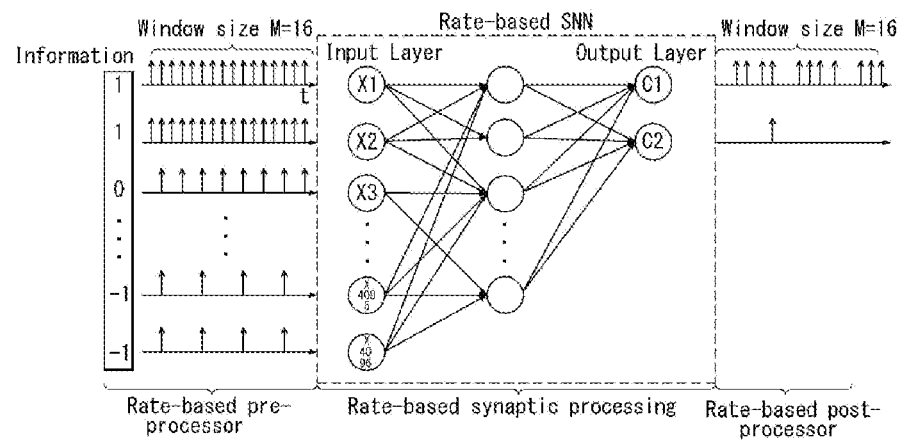
[FIG. 11]
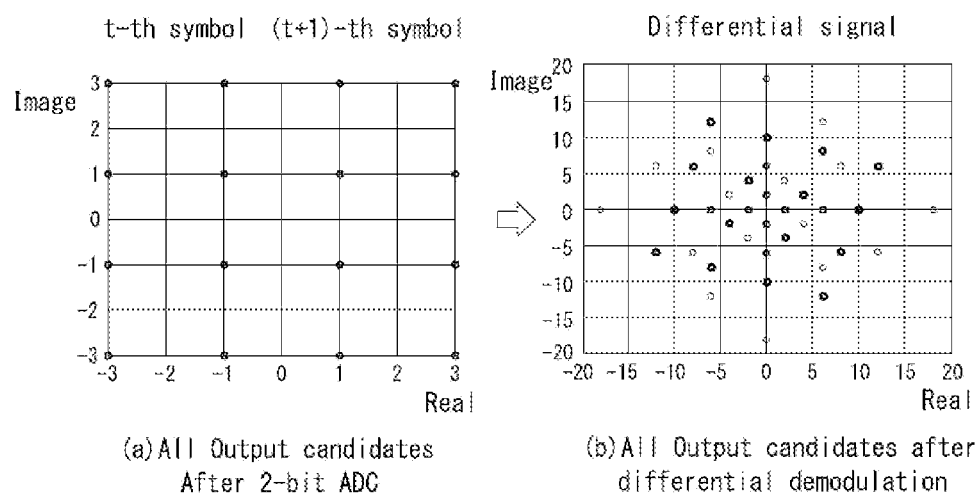
(a) All Output candidates After 2-bit ADC
(b) All Output candidates after differential demodulation

[FIG. 12]
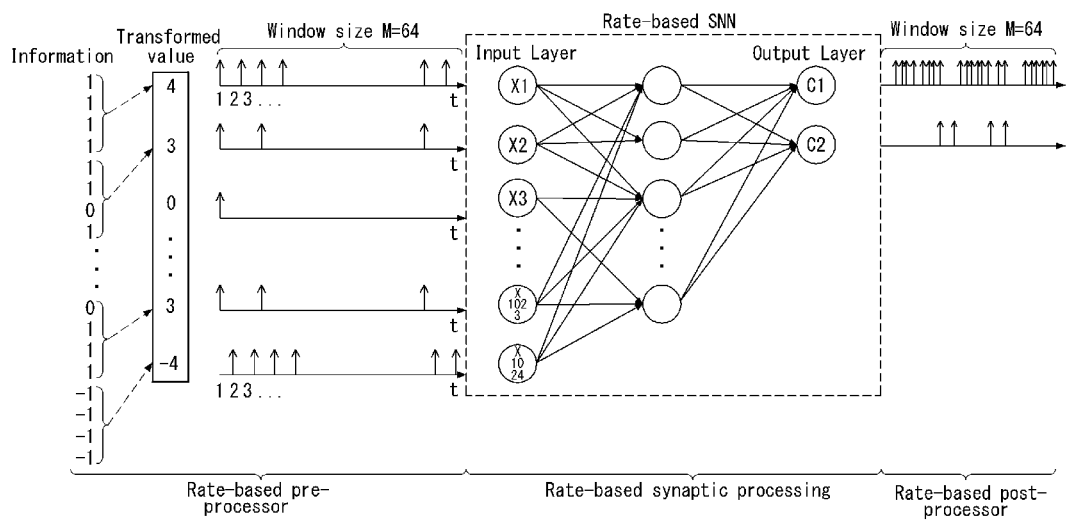
[FIG. 13]
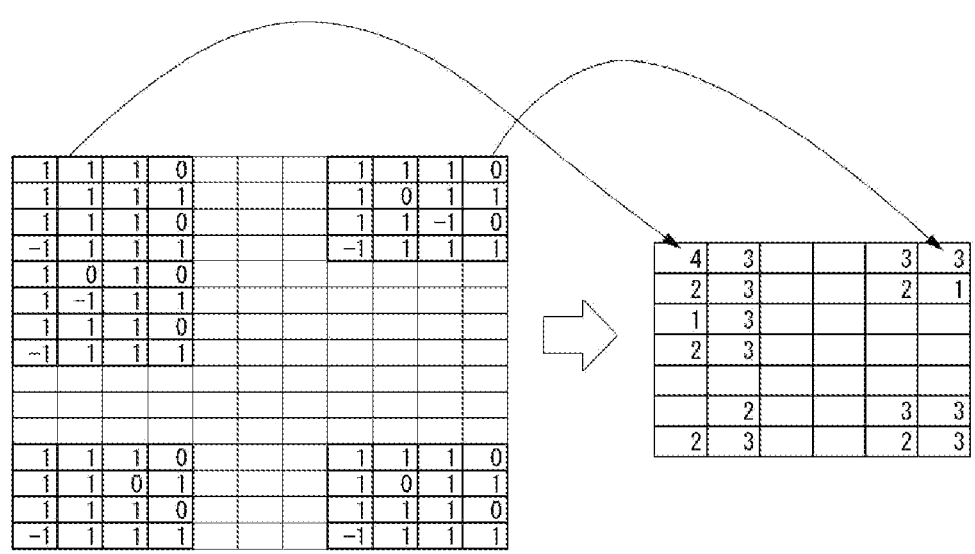

[FIG. 14]
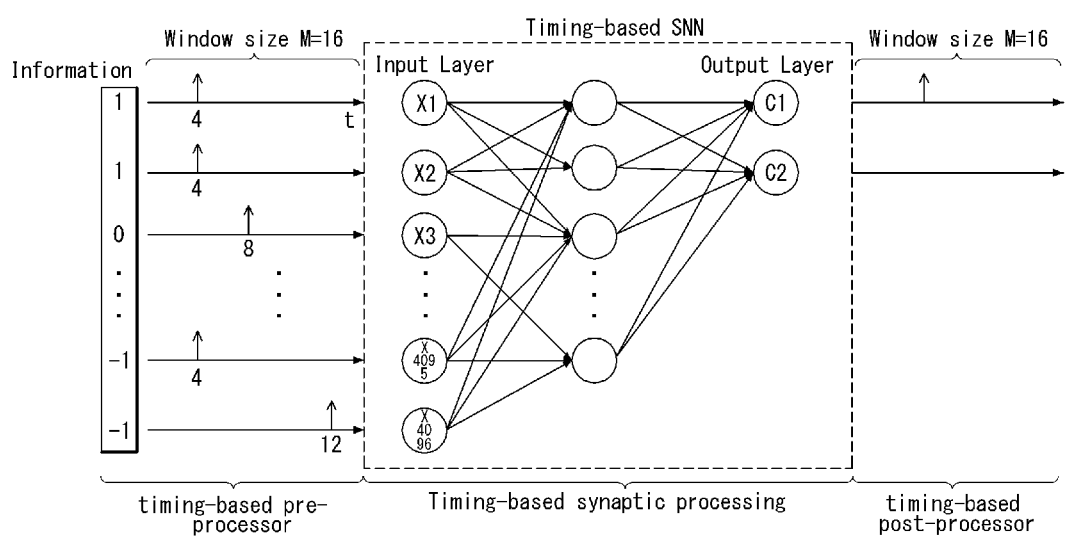

[FIG. 15]
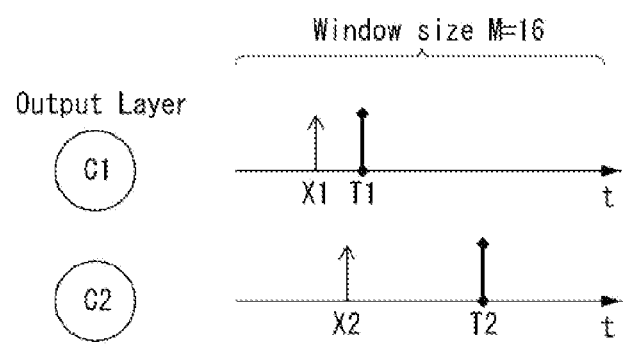
[FIG. 16]
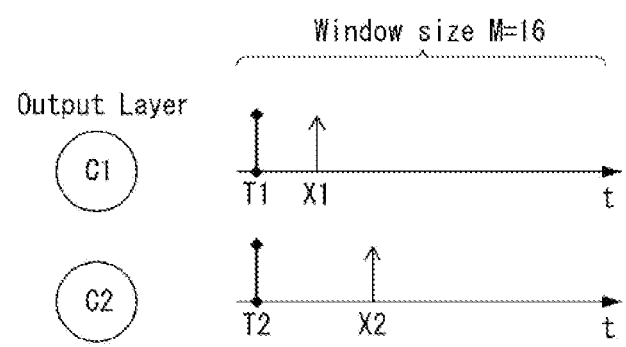

[FIG. 17]
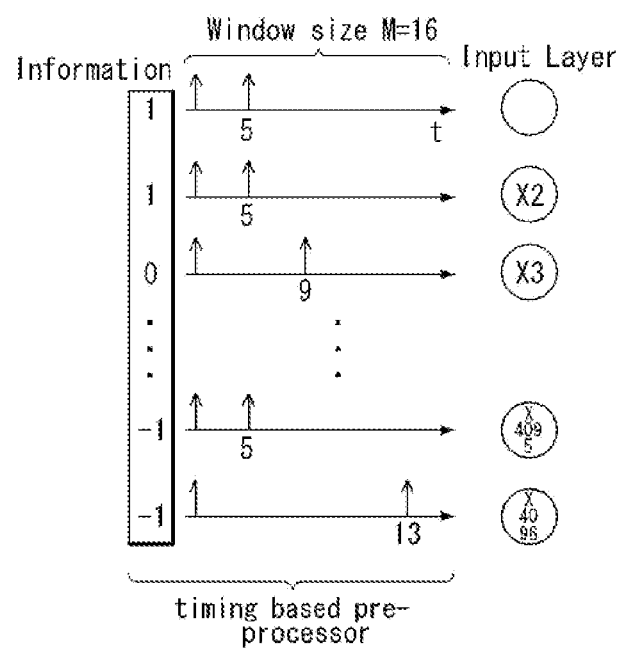

[FIG. 18]
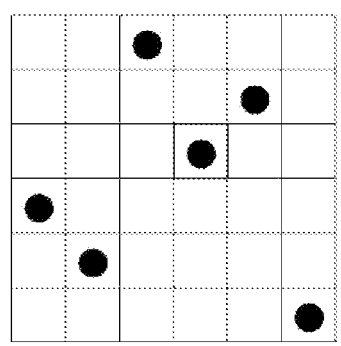
A costas array of order 6
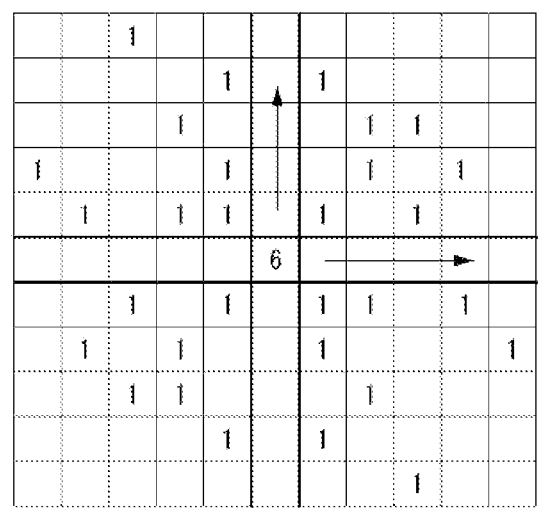
Auto-correlation

[FIG. 19]
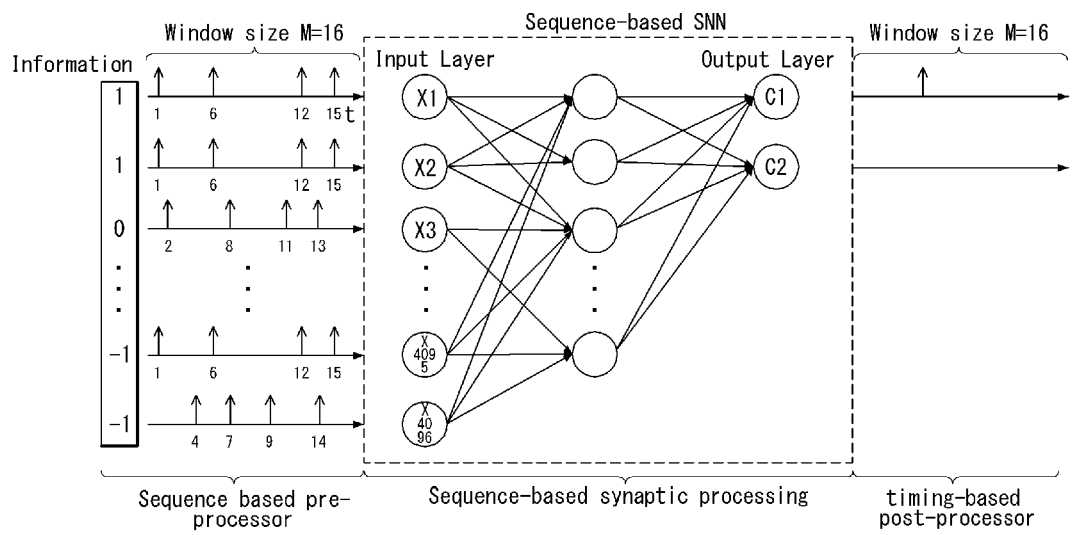
[FIG. 20]
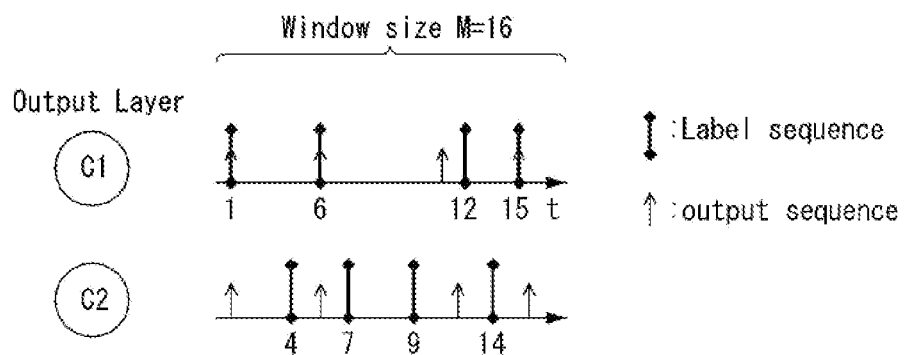

[FIG. 21]
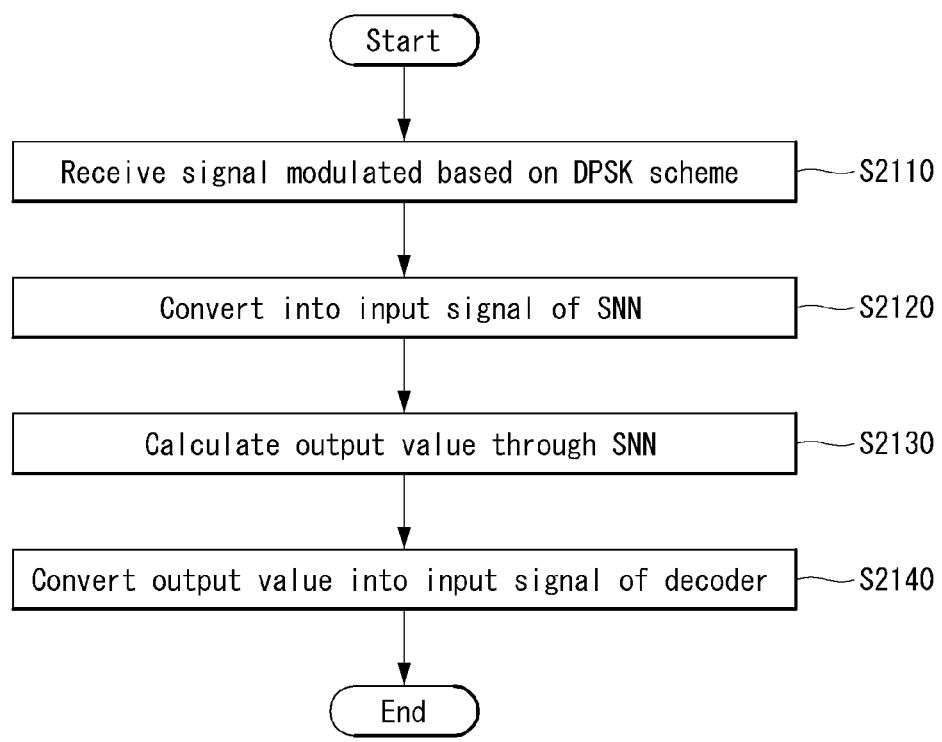

[FIG. 22]
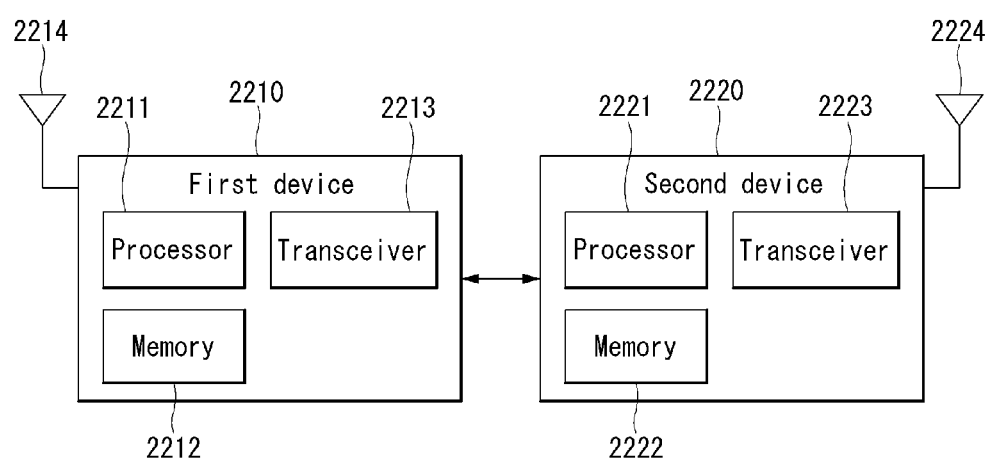

[FIG. 23]
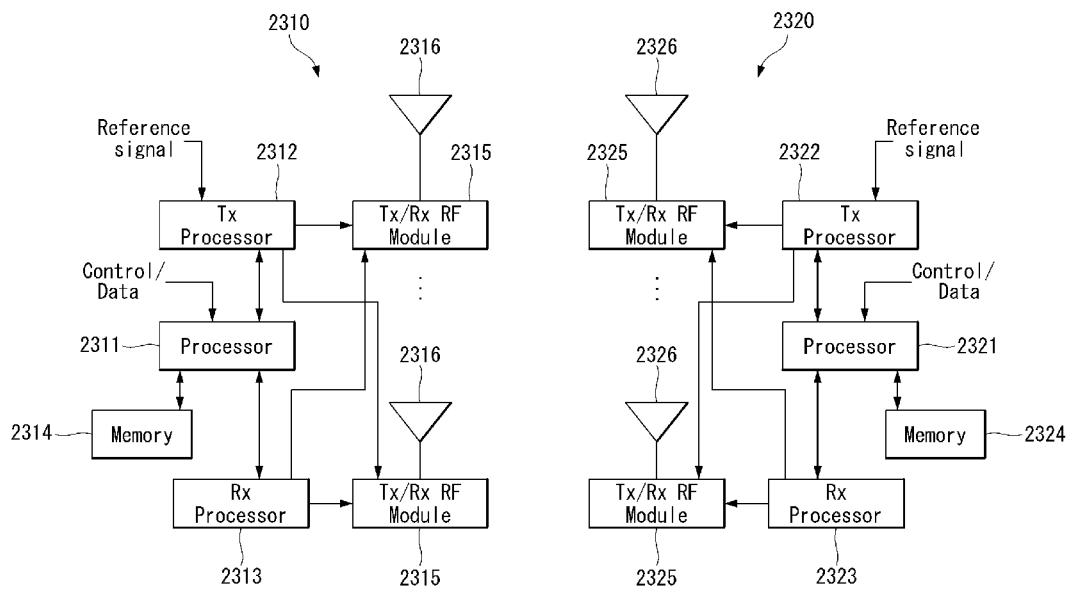
[FIG. 24]
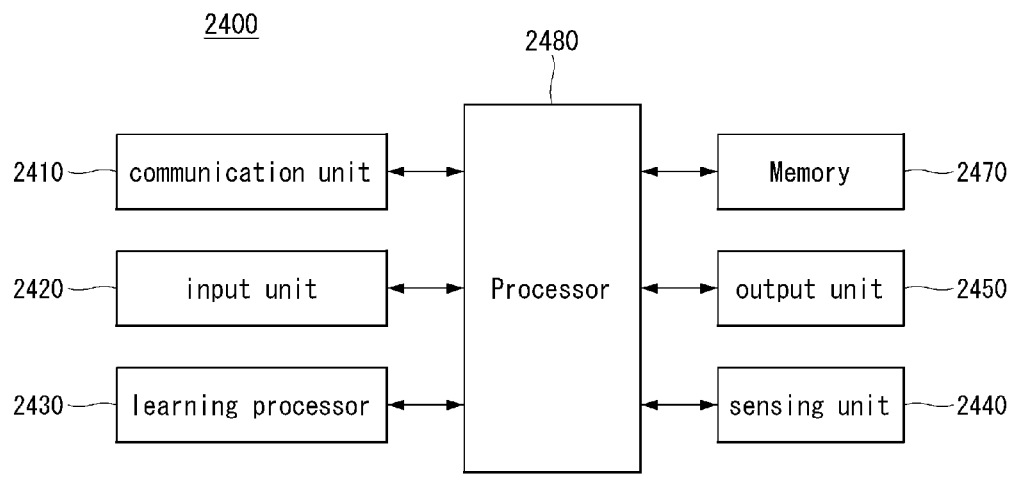

[FIG. 25]
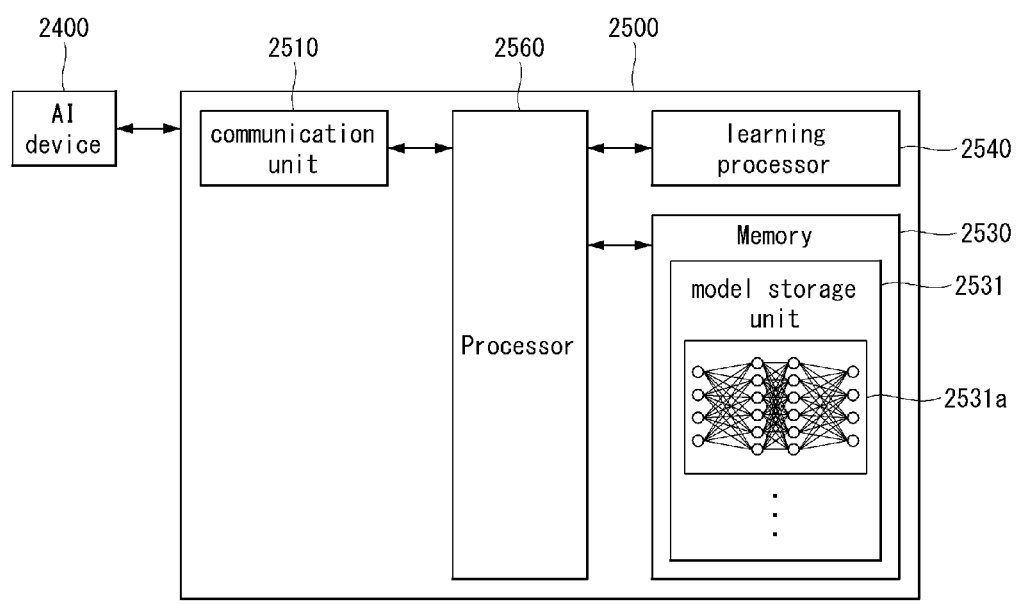

[FIG. 26]
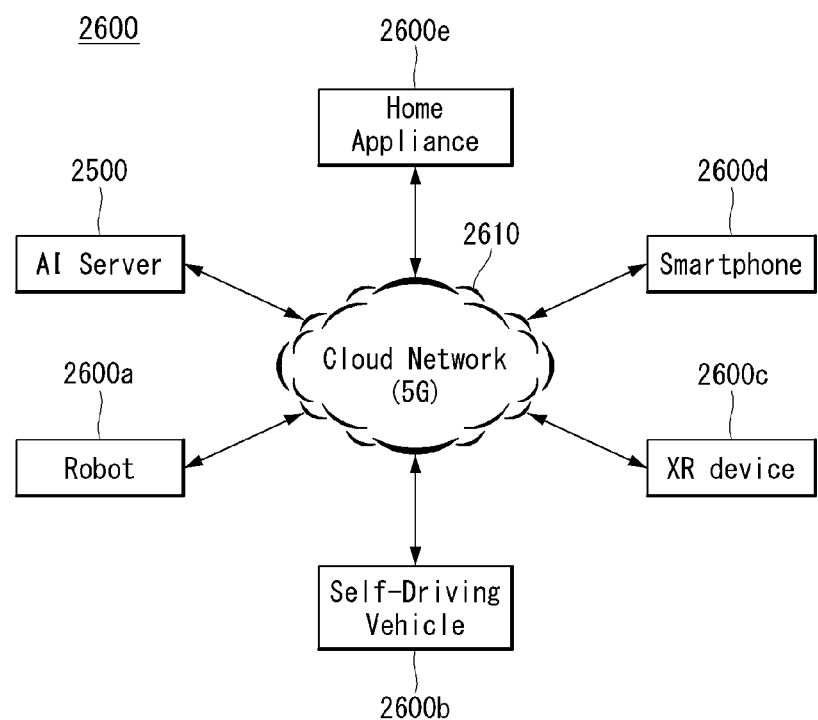

METHOD FOR TRANSMITTING OR RECEIVING SIGNAL IN LOW-BIT QUANTIZATION SYSTEM AND DEVICE THEREFOR

CROSS-REFERENCE TO RELATED APPLICATIONS

This application is the National Stage filing under 35 U.S.C. 371 of International Application No. PCT/KR2019/010566, filed on Aug. 20, 2019, the contents of which are all incorporated by reference herein in its entirety.

TECHNICAL FIELD

The present disclosure relates to a wireless communication system, and more particularly, to a method of transmitting and receiving signals in a communication system based on low-bit quantization and a device supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of transmitting and receiving signals, which is based on low-bit quantization in which energy efficiency is considered.

Specifically, the present disclosure proposes a pre-processing method for neural network learning with respect to a signal quantized with a low bit and a post-processing method for a value outputted as learning results, based on a differential phase shift keying modulation and demodulation scheme.

Technical problems to be solved by the present disclosure are not limited by the above-mentioned technical problems, and other technical problems which are not mentioned above can be clearly understood from the following description by those skilled in the art to which the present disclosure pertains.

Technical Solution

A method of a receiving device to transmit and receive signals in a wireless communication system according to an embodiment of the present disclosure may include receiving a signal modulated based on a differential phase shift keying (DPSK) scheme, from the transmitter, converting the received signal into an input signal of a spike neural network (SNN), calculating an output value through the pre-learnt spike neural network, and converting the output value into an input signal of a channel decoder.

Furthermore, in the method according to an embodiment of the present disclosure, the received signal may be converted into the input signal of the SNN based on any one of a spike rate, timing, and a sequence.

Furthermore, in the method according to an embodiment of the present disclosure, the input signal of the SNN and an input layer of the SNN may be one-to-one mapped for each other.

Furthermore, in the method according to an embodiment of the present disclosure, based on the received signal being converted based on the rate of the spike, a log value may be calculated based on a spike counter of the output value and converted into the input signal of the channel decoder.

Furthermore, in the method according to an embodiment of the present disclosure, based on the received signal being converted based on the timing, an LLR value may be calculated from the output value based on a time difference between the output value and a time label and converted into the input signal of the channel decoder.

Furthermore, in the method according to an embodiment of the present disclosure, based on the received signal being converted based on the sequence, the sequence may be generated by converting a Costas array into a one-dimensional sequence based on a row or column.

Furthermore, in the method according to an embodiment of the present disclosure, an LLR value may be calculated from the output value based on a degree of correlation between a sequence label and a sequence of the output value and converted into the input signal of the channel decoder.

Furthermore, in the method according to an embodiment of the present disclosure, an LLR value may be calculated from the output value based on a time difference between a sequence label and a sequence of the output value and converted into the input signal of the channel decoder.

Furthermore, in the method according to an embodiment of the present disclosure, the input signal of the channel decoder corresponds to a log-likelihood ratio (LLR) value calculated based on the output value.

Furthermore, in the method according to an embodiment of the present disclosure, by grouping the received signals, a sum of the signals of each group may be converted into the input signal of the SNN based on any one of a spike rate, timing, and a sequence.

Furthermore, in the method according to an embodiment of the present disclosure, based on the sum of the signals of each group being converted based on the rate of the spike, the conversion may be performed by additionally considering a time slot of the spike.

Furthermore, in the method according to an embodiment of the present disclosure, the received signal may correspond to a signal quantized to 1 to 3 bits.

A device for transmitting and receiving signals in a wireless communication system according to an embodiment of the present disclosure may include an analog to digital converter (ADC) that receives and quantizes signals modulated based on a Differential Phase Shift Keying (DPSK) scheme, a pre-processor that converts the signals quantized by the ADC into an input signal of a spike neural network (SNN), the spike neural network for calculating an output value based on a pre-learnt result, and a post-processor that converts the output value of the spike neural network into an input signal of a channel decoder.

Furthermore, in the device according to an embodiment of the present disclosure, the pre-processor may convert the signals into the input signal of the SNN based on any one of a rate of a spike, timing, and a sequence.

Furthermore, in the method according to an embodiment of the present disclosure, the pre-processor may convert the signals into the input signal of the channel decoder by calculating an LLR based on the output value.

Furthermore, in the method according to an embodiment of the present disclosure, the ADC may quantize the modulated signals into 1 or 3 bits.

Advantageous Effects

According to an embodiment of the present disclosure, power consumption of a system can be improved through the method of transmitting and receiving signals based on low-bit quantization.

Furthermore, according to an embodiment of the present disclosure, a non-linear relation between transmission and reception signals attributable to low-bit quantization can be understood through neural network learning.

Furthermore, according to an embodiment of the present disclosure, there are effects in that the number of activated neurons can be reduced and power consumption can be reduced by using the spike neural network learning method.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 is a diagram illustrating an example of a block diagram of a transmitting stage and a receiving stage.

FIG. 7 illustrates an example of a receiving device including 64×64 2-D antennas and a 1-bit analog to digital converter (ADC) connected to the antennas.

FIG. 8 illustrates an example in which modulation using a DBPSK scheme is performed.

FIG. 9 illustrates an example of a signal processing process for neural network learning in a device which transmits and receives signals based on low-bit quantization to which a method proposed in the present disclosure may be applied.

FIG. 10 illustrates an example in which a signal encoded based on a rate is outputted as an output value through SNN learning in a pre-processing step according to a method proposed in the present disclosure.

FIG. 11 is an example of a signal outputted through a 2-bit ADC and a differential demodulation value thereof.

FIG. 12 illustrates another example in which a signal encoded based on a rate is outputted as an output value through SNN learning in a pre-processing step according to a method proposed in the present disclosure.

FIG. 13 illustrates an example to which a P to 1 mapping rule is applied in a 2-D area according to a method proposed in the present disclosure.

FIG. 14 illustrates an example in which a signal encoded based on timing is outputted as an output value through SNN learning in a pre-processing step according to a method proposed in the present disclosure.

FIG. 15 illustrates an example of an output value of the SNN for a signal to which a timing-based encoding mapping rule has been applied according to a method proposed in the present disclosure.

FIG. 16 is another example of an output value of the SNN for a signal to which the timing-based encoding mapping rule has been applied according to a method proposed in the present disclosure.

FIG. 17 illustrates an example in which a signal encoded based on a time difference between two spikes is outputted as an output value through SNN learning in a pre-processing step according to a method proposed in the present disclosure.

FIG. 18 illustrates an example of a Costas array in an order 6 and an auto-correlation of the Costas array.

FIG. 19 illustrates an example in which a signal encoded based on a sequence is outputted as an output value through SNN learning in a pre-processing step according to a method proposed in the present disclosure.

FIG. 20 illustrates an example of an output value of the SNN for a signal to which a sequence-based encoding mapping rule has been applied according to a method proposed in the present disclosure.

FIG. 21 illustrates an example of an operating flowchart of a device which transmits and receives signals in a wireless communication system to which methods proposed in the present disclosure may be applied.

FIG. 22 illustrates a block configuration diagram of a wireless communication device to which methods proposed in the present disclosure may be applied.

FIG. 23 is another example of a block configuration diagram of a wireless communication device to which methods proposed in the present disclosure may be applied.

FIG. 24 illustrates an AI device 2400 according to an embodiment of the present disclosure.

FIG. 25 illustrates an AI server 2500 according to an embodiment of the present disclosure.

FIG. 26 illustrates an AI system 2600 according to an embodiment of the present disclosure.

MODE FOR DISCLOSURE

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New RAT (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 100) \cdot T_s = 1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots,\mu} - 1\}$ within a subframe and are numbered in increasing order of $n_{s,f}^\mu \in \{0, \ldots, N_{frame}^{slots,\mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, ..., $N_{RB}^\mu N_{sc}^{RB} - 1$ is an index on a frequency domain, and l=0, ..., $2^\mu N_{symb}^{(\mu)} - 1$ refers to a location of a symbol in a subframe. The index pair (k,l) is used to refer to a resource element in a slot, where l=0, ..., $N_{symb}^\mu - 1$.

The resource element (k,l) for the numerology and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB} = 12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}{}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Meanwhile, a PRB grid of each numerology supported by a carrier, a BWP configuration (support a maximum of 4 BWPs) in the carrier of each of the DL/UL, a code block group (CBG) configuration, transmission power control (TPC) per cell group, an HARQ process, a scrambling/sequence-related parameter, etc. may be configured in a carrier level. A control resource set (configured per cell, but associated per BWP), a parameter and DM-RS configuration related to resource allocation, a CSI-RS-related parameter, an SRS resource set, an HARQ-ACK and schedule request (SR) resource, a configured UL grant, etc. may be configured in a BWP level.

Enhanced Mobile Broadband communication (eMBB)

In the case of an NR system, a massive MIMO environment in which Tx and Rx antennas are greatly increased may be considered. That is, as the massive MIMO environment is considered, the number of Tx and Rx antennas may be increased to several tens or several hundreds of antennas or more. In the massive MIMO environment, for the purpose of a reduction in the complexity of a hardware implementation, a performance increase using multiple antennas, the flexibility of resource allocation, and the easiness of beam control for each frequency, there is a need for a beamforming scheme having a hybrid form in which an analog beamforming scheme and a digital beamforming scheme are combined based on a location where a beamforming weight vector/precoding vector are applied.

FIG. 6 is a diagram illustrating an example of a block diagram of a transmitting stage and a receiving stage. In this case, a Radio Frequency (RF) front-end ahead of an ADC has been omitted. FIG. 6 is merely for convenience of description, and does not limit the scope of the present disclosure.

Referring to FIG. 6, for example, the receiving device may include 4096 (e.g., 64×64) antennas, and may include a 1-bit ADC for an I (in-phase) signal (e.g., a real number signal) and a Q (quadrature) signal (e.g., an imaginary number signal) of an RX path connected to each antenna.

In the existing receiving device including a high-performance ADC, a received signal having an a+bj (e.g., a and b are numbers each represented as 8 bits to 10 bits) form as the output of the high-performance ADC is delivered through a baseband. Hereinafter, the output of the existing high-performance ADC signal is denoted as an unquantized version. The high-performance ADC may be excellent in the resolution aspect of an output signal, but may be disadvantageous in the power consumption aspect of a system.

In contrast, referring to FIG. 6, the type of signal delivered in the baseband through a 1-bit ADC may be limited to four per Rx path. That is, a signal of one of 1+j, 1−j, −1+j, and −1+j for each Rx path may be received. It may be difficult for a receiving device including a 1-bit ADC to obtain information, such as a Signal to Noise Ratio (SNR), due to an information loss, such as the size of a received signal, but to easily deliver information through phase information and to have power consumption of a system much smaller than that of a high-performance ADC.

The present disclosure is described based on a modulation scheme using a differential phase shift keying scheme (e.g., Differential Binary Phase Shift Keying (DBPSK), Differential Quadrature Phase Shift Keying (DQPSK)) and a demodulation scheme using a non-coherent detection scheme. A 1-bit quantization system may use the 1-bit ADC and thus may be substituted with a term called a 1-bit ADC system. Hereinafter, a differential BPSK (DBPSK) scheme is basically described for convenience of description. However, this is merely for convenience of description and does not limited the scope of the present disclosure. Accordingly, it is evident that the present disclosure may also be identically applied to a DQPSK scheme.

DPSK is a modulation scheme for delivering data based on a phase difference of a carrier between consecutive symbols. For example, in the DBPSK, "1" may be transmitted by adding 180° to a current phase, and "0" may be transmitted by adding 0° to a current phase. In the DQPSK, phase shifts may correspond to 0°, 90°, 180°, and −90° corresponding to data "00", "01", "11", and "10." In the receiving device, demodulation is possible when only a phase difference between neighbor symbols is aware.

FIG. 7 illustrates an example in which modulation using the DBPSK scheme is performed. In the modulation using the DBPSK scheme, in order to transmit 0, the same symbol as a symbol modulated in a previous symbol is transmitted. In order to transmit 1, a symbol is transmitted by applying a phase difference corresponding to pi in a previous symbol. Referring to FIG. 7, the transmitter may consecutively transmit 1, 1 in order to deliver 0, and may consecutively transmit 1, 0 in order to deliver 1. It may be assumed that while the transmitter transmits a signal, a coherence time, that is, a channel, is the same without being changed. Hereinafter, for convenience of description, the assumption that in the case of b=0, that is, 1, 1 are consecutively transmitted is described. However, this is merely for convenience of description and does not limited the scope of the present disclosure.

FIG. 8 illustrates an example of the results of a coded signal received by the receiving device after passing through the 1-bit ADC. The coded signal may be assumed to be a signal modulated based on the DBPSK scheme.

Referring to FIG. 8, in the case of an Rx path 1 (RX1), −1+j is received in a t-th symbol, and −1+j is also received in a (t+1)-th symbol. Accordingly, under the assumption that channels between the two symbols are the same, a receiving device may determine that 0 has been received through decoding. In this case, a differential value may be outputted as 2. That is, the differential value may be indicated as the product of a conjugate value of the value received in the t-th symbol and the value received in the (t+1)-th symbol. Even in the case of an Rx path 2 (RX2), likewise, after passing through channels, −1−j is received in a t-th symbol and a (t+1)-th symbol. A differential value may be outputted as 2. Accordingly, a receiving device may estimate that a transmitter has transmitted b=0.

As described above, in a transmission and reception method in the 1-bit ADC system, unlike the existing non-quantization version, one of four values may be delivered through a baseband. Information of the size of a signal is fully lost while passing through the 1-bit ADC, and an information loss may occur as phase information is quantized into four types. Furthermore, unlike a case where the existing high-performance ADC is used, an information loss may occur even in a system (or device) using a low-bit (e.g., 1 to 3 bits) ADC. Accordingly, the receiving device needs to consider a new reception scheme.

The present disclosure proposes a method of transmitting and receiving signals by using a neural network (e.g., spiking neural networks (SNNs)) capable of well learning a non-linear relation between transmission and reception signals attributable to the quantization of low bits (e.g., 1 to 3 bits). There are effects in that reception performance can be improved and power consumption of a receiving device can be reduced by using low-bit quantization and neural network learning.

Hereinafter, for the low-bit (e.g., 1 to 3 bits) quantization of a received signal, an example in which the receiving device uses a 1-bit ADC system is described. In this case, this is merely for convenience of description and does not limited the scope of the present disclosure. Accordingly, the present disclosure may also be applied to a receiving device using an ADC system of 3 bits or less.

Furthermore, a signal transmitted by a transmitter is assumed to be a signal modulated based on the DBPSK scheme. In this case, this is merely for convenience of description and does not limit the scope of the present disclosure. Accordingly, the present disclosure may also be applied to a signal modulated based on the DPSK scheme including the DQPSK scheme.

Furthermore, a case where the Rx path of the receiving device is 4096 (N=4096) is assumed and described. In this case, this is merely for convenience of description and does not limit the scope of the present disclosure. Accordingly, it is evident that the present disclosure may be applied to MIMO antenna environments having various form and numbers.

Furthermore, in the present disclosure, a spike neural network (SNN) among various neural networks is basically described. In this case, this is merely for convenience of description and does not limited the scope of the present disclosure. Accordingly, the present disclosure may also be applied to a neural network using a scheme similar to the SNN.

FIG. 9 illustrates an example of a signal processing process for neural network learning in a device which transmits and receives signals based on low-bit quantization to which a method proposed in the present disclosure may be applied. Referring to FIG. 9, a signal passing through a low bit ADC (e.g., 1-bit ADC) may be converted into an input signal of a channel decoder through a pre-processing step, neural network learning, and post-processing. The receiving device may include a low bit ADC, a pre-processor, a neural network (e.g., SNN), a post-processor, and a channel decoder in accordance with respective signal processing processes. In this case, the low bit may mean 1 to 3 bits.

A spiking neural network (hereinafter SNN) operates through a discrete spike occurring at specific timing. Whether a spike occurs may be determined by a differential equation indicating various biological processes. Tempo-spatial data may be processed through SNN learning. A spatial aspect means that values of an input layer are individually processed. A temporal aspect means that learning is performed as time goes and timing information of a spike can be obtained in an encoding process.

The SNN performs learning through rate coding, temporal coding, population coding, spatial coding, etc. Accordingly, the pre-processor needs to convert a signal sampled through the low-bit ADC (e.g., 1-bit ADC) into a form which may be learnt by the SNN. The post-processor needs to convert an output value of the SNN into an input value of the channel decoder. For example, the post-processor may convert the output value of the SNN into a log-likelihood ratio (hereinafter an LLR) and deliver the LLR as the input value of the channel decoder.

When the Rx path of the receiving device is N (N is a natural number), only a real number value may be taken from a symbol obtained by demodulating a signal modulated based on DBPSK through the 1-bit ADC for each Rx path, and +j and −j may be indicated as 0. That is, the pre-processor may receive, from the 1-bit ADC, a vector that consists of any one of elements {1, −1, 0} and has a size of N.

The pre-processor may convert the received signal into the input signal of the SNN. The post-processor may convert an output value of the SNN calculated through SNN learning into an input signal of the channel decoder. Hereinafter, operating methods of the pre-processor and the post-processor are specifically described.

<Method 1>

A spike rate-based pre-processing method and a spike counter-based post-processing method corresponding thereto may be considered. In this case, the rate may mean the number of spikes within a given window size. The pre-processor may encode (or convert) an output value into an input signal of the SNN based on the rate of a spike corresponding to each element constituting a vector having an N size, and may deliver the encoded signal as an input layer of the SNN.

Table 4 illustrates an example of a rate-based encoding mapping rule.

TABLE 4

| Parameter | Value |
| --- | --- |
| Window size M | 16 |
| Element value = 1 | 16 |
| Element value = 0 | 8 |
| Element value = −1 | 4 |

Referring to Table 4, if a window size is set to 16, the pre-processor may construct the rate of a spike as 16 with respect to 1, may construct the rate of a spike as 8 with respect to 0, and may construct the rate of a spike as 4 with respect to −1. That is, the pre-processor may differently construct the rate of a spike based on each element.

FIG. 10 illustrates an example in which a signal encoded based on Table 4 is outputted as an output value through SNN learning in a pre-processing step. FIG. 10 illustrates a case where the Rx path of a receiving device and the input layer (or input) of each neuron of an SNN are one-to-one mapped.

as the number of output bits of the ADC is increased, a window size may need to be increased. A spike rate may be differently configured for each element of 15 values. The pre-processor may convert an output signal of the 2-bit ADC into an input signal of the SNN by applying the encoding mapping rule of Table 5.

TABLE 5

| Parameters | Window | Element value | | | | | | | | | | | | | | |
|---|---|---|---|---|---|---|---|---|---|---|---|---|---|---|---|---|
| | M | 18 | 12 | 10 | 8 | 6 | 4 | 2 | 0 | −2 | −4 | −6 | −8 | −10 | −12 | −18 |
| value | | 160 | 150 | 140 | 130 | 120 | 110 | 100 | 90 | 80 | 80 | 60 | 50 | 40 | 30 | 20 | 10 |

Referring to FIG. 10 and Table 4, the pre-processor may generate a spike a rate corresponding to each element that constitutes a vector having a 4096 size. Each element may correspond to an information bit, and may be mapped to the rate of 16 spikes when the information bit is 1, to the rate of 8 spikes when the information bit is 0, and to the rate of 4 spikes when the information bit is −1. The information bit may be delivered as the input layer of the SNN. The learnt SNN may output many spikes at the output of a class corresponding to the output layer. In other words, the learnt SNN may output many spikes so that they are approximate to a spike rate suitable for a corresponding class in the output layer. For example, when a label is 0, the SNN may be trained to output more spikes at an output node corresponding to 0.

A node of the SNN output layer may consist of a plurality of nodes. The plurality of nodes may be merged into the same node and may perform learning and operate. Accordingly, in FIGS. 10, C1 and C2 may be merged into the same node and may perform learning and operate. The post-processor may convert an output value of the SNN into an input signal of the channel decoder based on a spike rate. An LLR may be calculated based on a ratio of a spike counter (e.g., the number of spikes) of the SNN output layer, and the calculated LLR value may be delivered to the channel decoder. As a detailed example, a value obtained by dividing the spike counter of C1 by a spike counter value of C2 and taking a log may be delivered to the input of the channel decoder.

Furthermore, for example, the rate-based encoding mapping rule in a receiving device including a 2-bit ADC system is described.

FIG. 11 is an example of a signal outputted through a 2-bit ADC and a differential demodulation value thereof. Referring to FIG. 11, a value of a signal modulated based on DBPSK, which is outputted through the 2-bit ADC, may be outputted in the form of one of a total of 16 values, that is, four in a real number area and 4 in an imaginary number area. A differential demodulation value thereof may be expressed as one of a total of 40 values. Among them, if values having a real number area are selected, the values may be outputted as one of a total of 15 values as follows. The following values may be changed based on an output value of the 2-bit ADC, and may be scaled.

{18, 12, 10, 8, 6, 4, 2, 0, −2, −4, −6, −8, −10, −12, −18}

The pre-processor may perform encoding by applying the rate-based encoding mapping rule to an output signal of the 2-bit ADC.

Table 5 illustrates an example of the encoding mapping rule of a rate-based 2-bit ADC output. Referring to Table 5, The post-processor may convert the output value of the SNN into the input signal of the channel decoder based on a spike rate. The post-processor may calculate an LLR based on the spike rate of the SNN output layer, and may deliver the calculated LLR value to the channel decoder.

Meanwhile, in addition to the method of one-to-one mapping an Rx path and an input layer (or input) of each neuron of the SNN, a method of reducing the number of neurons of the SNN input layer by grouping values of several Rx paths and mapping each group and the input layer of the SNN may be considered.

For example, Rx paths are in a P (P is a natural number equal to or greater than 2) unit. A value obtained by adding elements of each Rx path within the combined group may be mapped to a neuron of the input layer of the SNN. In this case, in order to distinguish between sum values, a time slot may be used. As a detailed example, when P=4, the sum of elements in a group in which Rx paths are combined every four may include values from a maximum of 4 to −4. Accordingly, the rate-based encoding mapping rule may be applied based on the sum.

Table 6 illustrates an example of the rate-based encoding mapping rule when P=4.

TABLE 6

| Parameter | Value |
|---|---|
| Window size M | 64 |
| Value = 4 | 32 (odd-numbered time slot) |
| Value = 3 | 16 (odd-numbered time slot) |
| Value = 2 | 8 (odd-numbered time slot) |
| Value = 1 | 4 (odd-numbered time slot) |
| Value = 0 | 1 (odd-numbered time slot) |
| Value = −1 | 4 (even-numbered time slot) |
| Value = −2 | 8 (even-numbered time slot) |
| Value = −3 | 16 (even-numbered time slot) |
| Value = −4 | 32 (even-numbered time slot) |

Referring to Table 6, a sum value of the elements of each Rx path within a combined Rx path group may be indicated as one of integers having a −4 to 4 range. A spike rate may be constructed in accordance with each sum value. In this case, in order to distinguish between sum values, a time slot may be used. For example, when a sum value is 4 and −4, the rate of a spike is identically 32, but sum values may be distinguished by dividing a time slot in which a spike occurs into an odd-numbered time slot and an even-number time slot.

FIG. 12 illustrates another example in which a signal encoded based on Table 6 is outputted as an output value through SNN learning in a pre-processing step according to a method proposed in the present disclosure. FIG. 12 illustrates a case where the Rx path of the receiving device and the input layer of each neuron of an SNN correspond to each other in a P (e.g., P=4) to 1 way.

Referring to FIG. 12 and Table 6, the pre-processor may group vectors having a 4096 size by combining the vectors every four, and may generate a spike at a rate corresponding to a sum value by adding the elements of 4 Rx paths for each group. The generated spike may be delivered to the input layer of the SNN. The learnt SNN may output many spikes at the output of a corresponding class in an output layer thereof. In other words, the SNN may output the many spikes so that they are approximate to a spike rate suitable for a corresponding class. A node of the SNN output layer may include a plurality of nodes. The plurality of nodes may be merged into the same node and may perform learning and operate.

The post-processor may convert an output value of the SNN into an input signal of the channel decoder based on the spike rate. The post-processor may calculate an LLR based on the spike rate of the SNN output layer, and may deliver the calculated LLR value to the channel decoder. As a detailed example, the post-processor may deliver, as the input of the channel decoder, a value obtained by dividing the spike counter of C1 by the spike counter value of C2 and taking a log.

In addition to the method of P-to-1 mapping the Rx path of the receiving device and the input layer of each neuron of the SNN in a one-dimension area, a method for P to 1 mapping in a 2-D area may also be considered.

FIG. 13 illustrates an example in which a P to 1 mapping rule is applied in the 2-D area. FIG. 13 is merely for convenience of description and does not limited the scope of the present disclosure.

Referring to FIG. 13, a matrix may be constructed in accordance with a shape of a 2-D antenna, and the matrix may be reconstructed by combining constituent elements of the matrix every P. An input layer of each neuron of an SNN may be mapped based on the reconstructed matrix. Specifically, a matrix having a 64×64(=4096) size may be constructed in association with an actual location of a 2D antenna shape constructed in a 64×64 form. The matrix may be reconstructed into a matrix having a 32×32 size by combining the matrix every four. An input layer of each neuron of the SNN may be mapped based on the matrix.

<Method 2>

A timing-based pre-processing method and a spike counter-based post-processing method corresponding thereto may be considered.

For example, a timing offset for each element constituting a matrix having an N size may be encoded (or converted) into an input signal of the SNN by differently applying the timing offset in a pre-processing step. The encoded signal may be delivered as the input layer of the SNN.

TABLE 7

| Parameter | Value (timing offset) |
| --- | --- |
| Window size M | 16 |
| Element value = 1 | 4 |
| Element value = 0 | 8 |
| Element value = −1 | 12 |

Table 7 illustrates an example of the time-based encoding mapping rule. Referring to Table 7, when a window size is set to 16, the pre-processor may construct a time offset as 4 with respect to 1, may construct a time offset as 8 with respect to 0, and may construct a time offset as 12 with respect to −1.

FIG. 14 illustrates an example in which a signal encoded based on Table 7 is outputted as an output value through SNN learning in a pre-processing step according to a method proposed in the present disclosure. FIG. 14 illustrates a case where the Rx path of the receiving device and the input layer (or input) of each neuron of the SNN correspond to each other in a one-to-one manner.

Referring to FIG. 14 and Table 7, the pre-processor may generate a spike by applying a time offset corresponding to each element constituting a vector having a 4096 size. Specifically, a spike may be generated in t=4 with respect to 1, a spike may be generated in t=8 with respect to 0, and a spike may be generated in t=12 with respect to −1. The generated spike may be delivered to the input layer of the SNN. The SNN may be trained to output a spike suitable for output timing of a corresponding class in an output layer thereof. The post-processor may convert an output value of the SNN into an input signal of the channel decoder based on the timing of the spike.

FIG. 15 illustrates an example of an output value of the SNN for a signal to which the timing-based encoding mapping rule has been applied according to a method proposed in the present disclosure. Referring to FIG. 15, T1 means a timing label of an output layer node C1, and T2 means a timing label of an output layer node C2. In this case, the timing label may be predefined for SNN learning. X1 and X2 correspond to output values in the output layer nodes, respectively. The output value of C1 means 1, and the output value of C2 means 0. An output value calculated as the results of the learning of a (pre-learnt) SNN may be interpreted depending on how closely to a pre-defined timing label has the output value been outputted. Accordingly, a time difference between the timing label and the output value of the SNN may be indicated as a probability.

The post-processor may convert the output value of the SNN into an input signal of the channel decoder based on the time difference between the timing label and the output value of the SNN. The post-processor may calculate an LLR based on the time difference between a timing label of an SNN output layer and the output value, and may deliver the calculated LLR value to the channel decoder. Specifically, as in Equation 3, the post-processor may calculate the LLR based on a time difference between T1 and X1 and a time difference between T2 and X2.

$$LLR = \log \frac{f(|T1 - X1|)}{f(|T2 - X2|)} \quad \text{[Equation 3]}$$

wherein f means a function, such as $f(x)=e^{-x^2}$. In this case, this is merely an example, and the function f may be any function indicating a probability.

FIG. 16 is another example of an output value of the SNN for a signal to which the timing-based encoding mapping rule has been applied according to a method proposed in the present disclosure. Referring to FIG. 16, T1 means a timing label of an output layer node C1, and T2 means a timing label of an output layer node C2. In this case, the timing label may be predefined for SNN learning. The timing label of each output node may be configured based on the same time. An output value calculated as the results of the learning of the SNN may be interpreted depending on how much latency has been generated and outputted based on a predefined timing label. Accordingly, an LLR may be calculated depending on how quickly a spike occurs based on a timing label of each output layer node configured in the same time (or depending on how much latency has occurred until a spike is generated). The post-processor may convert an output value of the SNN into an LLR based on a time difference between the timing label and the output value according to Equation 3, and a redundant description thereof is omitted.

Furthermore, for example, a pre-processing method based on a time difference between two spikes may be considered. In a pre-processing step, an output value may be encoded (or converted) into an input signal of the SNN by differently configuring a time difference between two spikes for each element constituting a vector having an N size. The encoded signal may be delivered as the input layer of the SNN.

Table 8 illustrates an example of an encoding mapping rule based on a time difference between two spikes.

TABLE 8

| Parameter | Value (timing of two spikes) |
| --- | --- |
| Window size M | 16 |
| Element value = 1 | 1, 5 |
| Element value = 0 | 1, 9 |
| Element value = −1 | 1, 13 |

Referring to Table 8, when a window size is set to 16, a first spike may be generated in t=1 and a second spike may be generated in t=5 with respect to 1, and encoding may be performed. That is, 4 may be applied to a time difference between the two spikes. A first spike may be generated in t=1 and a second spike may be generated in t=9 with respect to 0, and encoding may be performed. That is, 8 may be applied to a time difference between the two spikes. A first spike may be generated in t=1 and a second spike may be generated in t=13 with respect to −1, and encoding may be performed. That is, 12 may be applied to a time difference between the two spikes.

FIG. 17 illustrates an example in which a signal encoded based on Table 8 is outputted as an output value through SNN learning in a pre-processing step. FIG. 17 illustrates a case where an Rx path of a receiving device and an input layer of each neuron of an SNN correspond to each other in a one-to-one manner. Referring to FIG. 17 and Table 8, the pre-processor may perform encoding by applying a time difference between two spikes according to the encoding mapping rule, and may deliver the encoded signal to the input layer of the SNN.

A value of a signal encoded based on a time difference between two spikes and outputted through SNN learning may be interpreted depending on how closely to a pre-defined timing label has the value been outputted as described above. Alternatively, the value may be interpreted depending on how much latency has been generated and outputted based on a pre-defined timing label. The post-processor may convert an output value of the SNN into an input signal of the channel decoder based on a time difference between the timing label and the output value of the SNN. Specifically, the post-processor may convert the output value into an LLR value according to Equation 3, and may deliver the LLR value to the channel decoder.

Meanwhile, in addition to the method of one-to-one mapping the Rx path and the input layer of each neuron of the SNN, a method of reducing the number of neurons of an SNN input layer by grouping values of several Rx paths and mapping each group and the input layer of the SNN may be considered. For example, Rx paths may be combined every P (P is a natural number equal to or greater than 2), and a sum value of elements of each Rx path within the combined group may be mapped to a neuron of the input layer of the SNN. In this case, a time slot may be used to distinguish between sum values.

As a detailed example, Table 9 illustrates an example of a time-based P-to-1 encoding mapping rule when P=4. When P=4, the sum of elements in a group in which Rx paths are combined every four may include values from a maximum of 4 to −4. Accordingly, the time-based encoding mapping rule may be applied based on the sum. A time offset of a spike may be applied in accordance with a sum value of each group.

TABLE 9

| Parameter | Value |
| --- | --- |
| Window size M | 65 |
| value = 4 | 1 |
| value = 3 | 9 |
| value = 2 | 17 |
| value = 1 | 25 |
| value = 0 | 33 |
| Value = −1 | 41 |
| Value = −2 | 49 |
| Value = −3 | 57 |
| Value = −4 | 65 |

Furthermore, as described above in Method 1, even when the timing-based encoding mapping rule is applied, an Rx path and the input layer of each neuron of the SNN may be P-to-1 mapped in a 2-D area. Accordingly, a redundant description thereof is omitted.

<Method 3>

A sequence-based pre-processing method and a sequence-based post-processing method corresponding thereto may be considered. The pre-processor may encode (or convert) the output of the ADC into an input signal of the SNN based on a sequence corresponding to each element constituting a vector having an N size, and may deliver the encoded signal into the input layer of the SNN.

In order to generate the sequence, a Costas array may be used. The Costas array means a matrix in which only one element (entry) has a value of 1 in each row or column in an n×n matrix, the remaining elements has 0, and a condition in which n(n−2)/2 vectors between all elements having the value of 1 are different is satisfied. If the condition is satisfied, the Costas array has an ideal auto-ambiguity function. Several Costas arrays may be present depending on an order n. For example, in an order n=6, 116 Costas arrays are present. The Costas array may be generated using various methods, such as Welch and Lempel-Golomb.

FIG. 18 illustrates an example of a Costas array in an order 6 and an auto-correlation of the Costas array.

A two-dimensional Costas array may be converted into a one-dimensional sequence by rearranging the two-dimensional Costas column-wise (or row-wise). Each element constituting a vector having an N size may be mapped to the generated one-dimensional sequence, and encoding may be performed. In this case, an element having the longest distance between sequences may be selected and mapped.

For example, a Costas array having an order of 4 includes a total of 12 and is as follows.

(1, 2, 4, 3), (1, 3, 4, 2), (1, 4, 2, 3), (2, 1, 3, 4), (2, 3, 1, 4), (2, 4, 3, 1), (3, 1, 2, 4), (3, 2, 4, 1), (3, 4, 2, 1), (4, 1, 3, 2), (4, 2, 1, 3), (4, 3, 1, 2)

Table 10 is an example in which a 4-order Costas array has been changed into a one-dimensional sequence. An index capable of distinguishing between sequences may be assigned. The encoding mapping rule may be determined based on the generated one-dimensional sequence.

TABLE 10

| Index | Sequence |   |   |   |   |   |   |   |   |   |   |   |   |   |   |   |
|---|---|---|---|---|---|---|---|---|---|---|---|---|---|---|---|---|
| 1  | 1 | 0 | 0 | 0 | 0 | 1 | 0 | 0 | 0 | 0 | 0 | 1 | 0 | 0 | 1 | 0 |
| 2  | 1 | 0 | 0 | 0 | 0 | 0 | 1 | 0 | 0 | 0 | 0 | 1 | 0 | 1 | 0 | 0 |
| 3  | 1 | 0 | 0 | 0 | 0 | 0 | 0 | 1 | 0 | 1 | 0 | 0 | 0 | 0 | 1 | 0 |
| 4  | 0 | 1 | 0 | 0 | 1 | 0 | 0 | 0 | 0 | 0 | 1 | 0 | 0 | 0 | 0 | 1 |
| 5  | 0 | 1 | 0 | 0 | 0 | 0 | 1 | 0 | 1 | 0 | 0 | 0 | 0 | 0 | 0 | 1 |
| 6  | 0 | 1 | 0 | 0 | 0 | 0 | 0 | 1 | 0 | 0 | 1 | 0 | 1 | 0 | 0 | 0 |
| 7  | 0 | 0 | 1 | 0 | 1 | 0 | 0 | 0 | 0 | 1 | 0 | 0 | 0 | 0 | 0 | 1 |
| 8  | 0 | 0 | 1 | 0 | 0 | 1 | 0 | 0 | 0 | 0 | 0 | 1 | 1 | 0 | 0 | 0 |
| 9  | 0 | 0 | 1 | 0 | 0 | 0 | 0 | 1 | 0 | 1 | 0 | 0 | 1 | 0 | 0 | 0 |
| 10 | 0 | 0 | 0 | 1 | 1 | 0 | 0 | 0 | 0 | 0 | 1 | 0 | 0 | 1 | 0 | 0 |
| 11 | 0 | 0 | 0 | 1 | 0 | 1 | 0 | 0 | 1 | 0 | 0 | 0 | 0 | 0 | 1 | 0 |
| 12 | 0 | 0 | 0 | 1 | 0 | 0 | 1 | 0 | 1 | 0 | 0 | 0 | 0 | 1 | 0 | 0 |

Table 11 illustrates an example of a sequence-based encoding mapping rule.

TABLE 11

| Parameter | Value (sequence index) |
|---|---|
| Window size M | 16 |
| Element value = 1 | 1 |
| Element value = 0 | 6 |
| Element value = −1 | 12 |

Referring to Table 11, when a window size is set to 16, 1 may correspond to a sequence index 1, 0 may correspond to a sequence index 6, and −1 may correspond to a sequence index 12. A sequence index may be differently applied based on each element, and thus a different sequence may be applied.

FIG. 19 illustrates an example in which a signal encoded based on Table 11 is outputted as an output value through SNN learning in a pre-processing step. FIG. 19 illustrates a case where an Rx path of a receiving device and an input layer (or input) of each neuron of an SNN correspond to each other in a one-to-one manner.

Referring to FIG. 19 and Table 11, the pre-processor may generate a spike as a sequence corresponding to each element constituting a vector having a 4096 size. The SNN may be trained to output a spike corresponding to an output sequence of a corresponding class or timing of the sequence in an output layer thereof. The post-processor may convert an output value of the SNN into an input signal of the channel decoder based on the sequence or the timing of the sequence.

FIG. 20 illustrates an example of an output value of the SNN for a signal to which the sequence-based encoding mapping rule has been applied according to a method proposed in the present disclosure. Referring to FIG. 20, a bit corresponding to an output layer node C1 means 1, and a bit corresponding to an output layer node C2 means 0. An output sequence of C1 shows a high degree of correlation with a sequence label, whereas an output sequence of C2 shows a low degree of correlation with a sequence label. In this case, the sequence label may be predefined for SNN learning. A sequence outputted as the results of the learning of the SNN may be interpreted depending on how much is the sequence similar to the sequence label. In other words, the sequence may be determined based on a degree of correlation between the sequence label and an actual output sequence.

The post-processor may convert an output value of the SNN into an input signal of the channel decoder based on a degree of correlation between a sequence label and an output sequence. Equation 4 is an equation for calculating an LLR based on a degree of correlation between a sequence label and an output sequence. The post-processor may deliver the calculated LLR value to the channel decoder.

$$LLR = \log \frac{f(|L1 - X1|)}{f(|L2 - X2|)}$$

L1/L2: label sequence, X1/X2: output sequence wherein f means a correlation function, for example.

Or, the post-processor may convert the output value of the SNN into the input signal of the channel decoder based on a time difference between the sequence label and the output sequence. Specifically, according to Equation 3, the post-processor may calculate an LLR based on a time difference between the sequence label of the SNN output layer and the output sequence. Accordingly, a redundant detailed description thereof is omitted. The post-processor may deliver the calculated LLR value to the channel decoder.

Meanwhile, in addition to the method of one-to-one mapping an Rx path and an input layer of each neuron of the SNN, a method of reducing the number of neurons of the SNN input layer by grouping values of several Rx paths and mapping each group and the input layer of the SNN may be considered. For example, Rx paths may be combined every P (P is a natural number equal to or greater than 2), and a sum value of elements of each Rx path within the combined group may be mapped to a neuron of the input layer of the SNN. In this case, an element having the longest distance between sequences may be selected.

As a detailed example, when P=4, the sum of elements in a group in which Rx paths are combined every four may include values from a maximum of 4 to −4. Accordingly, the sequence-based encoding mapping rule may be applied based on the sum.

Table 12 illustrates an example of the sequence-based encoding mapping rule when P=4.

TABLE 12

| Parameter | Sequence index |
|---|---|
| Window size M | 25 |
| value = 4 | 1 |
| value = 3 | 3 |
| value = 2 | 5 |

TABLE 12-continued

| Parameter | Sequence index |
|---|---|
| value = 1 | 7 |
| value = 0 | 9 |
| Value = −1 | 11 |
| Value = −2 | 13 |
| Value = −3 | 15 |
| Value = −4 | 17 |

Referring to Table 12, a sum value of elements of each Rx path within a combined Rx path group may be indicated as one of integers of a −4 to 4 range. A spike sequence may be differently applied in accordance with each sum value. That is, an index of a spike sequence may be differently mapped for each element of each sum value.

Furthermore, in addition to the method of P-to-1 mapping an Rx path and the input layer of each neuron of the SNN in a one-dimension area, an Rx path and the input layer of each neuron of the SNN may be P-to-1 mapped in a 2-D area even in the sequence-based encoding mapping. A matrix may be constructed in accordance with a shape of a 2-D antenna, and the matrix may be reconstructed by combining constituent elements of the matrix every P. Each neuron of the SNN may be mapped based on the reconstructed matrix.

There are effects in that power consumption of a receiving device can be reduced through the aforementioned methods and embodiments, and a signal loss attributable to the low-bit quantization and non-linearity between transmission and reception signals can be improved through SNN learning.

FIG. 21 illustrates an example of an operating flowchart of a device which transmits and receives signals in a wireless communication system to which methods proposed in the present disclosure may be applied.

Referring to FIG. 21, a receiving device may receive, from a transmitter, a signal modulated based on a differential phase shift keying (DPSK) scheme (S2110). The receiving device may receive a signal modulated through a plurality of Rx paths. Each of the plurality of Rx paths of the receiving device may include a low-bit ADC. In this case, the low bit may correspond to 1 to 3 bits. The signal modulated based on DPSK may be quantized into a low bit through the low-bit ADC. That is, the received signal may correspond to a signal quantized to 1 to 3 bits.

The receiving device may convert the received signal an input signal of a spiking neural network (SNN) (S2120). The conversion into the input signal of the SNN may be performed based on Method 1 to Method 3. For example, the received signal may be converted into the input signal of the SNN based on any one of a spike rate, timing, and a sequence.

As a detailed example, the received signal may be converted (or encoded) into the input signal of the SNN based on a rate of a spike corresponding to each element of the received signal. In this case, the rate may mean the number of spikes within a given window size. The number of spikes within a given window size may be differently applied for each element. Alternatively, the received signal may be converted into the input signal of the SNN based on timing of a spike corresponding to each element of the received signal. The received signal may be converted into the input signal by differently applying a time offset of the spike for each element. The received signal may be converted into the input signal based on a time difference between two spikes corresponding to each element. Alternatively, The received signal may be converted into the input signal of the SNN based on a sequence of a spike corresponding to each element of the received signal. In this case, in order to generate the sequence, a Costas array may be used. A two dimensional Costas array may be converted into a one-dimensional sequence by rearranging the two dimensional Costas array based on any one of a row-wise unit or a column-wise unit. A conversion may be performed by mapping each element of the received signal to the generated one-dimensional sequence. In this case, an element having the longest distance between sequences may be selected and mapped.

The received signal and the input layer of the SNN may be one-to-one mapped. That is, when the received signal is converted into the input signal of the SNN, the input signal of the SNN and the input layer of the SNN may be one-to-one mapped. Or the received signals may be grouped in a specific unit, and each group and the input layer of the SNN may be mapped. Specifically, the received signals may be grouped, and the sum of the signals of each group may be converted into the input signal of the SNN based on any one of a spike rate, timing, and a sequence and mapped to the input layer of the SNN. If the sum of the signals of each group is converted based on a rate of a spike, the conversion may be performed by additionally considering a time slot of the spike.

An output value may be calculated by performing SNN learning based on the input signal of the SNN delivered to the input layer of the SNN (S2130). That is, the output value may be calculated through a pre-learnt SNN neural network. The output value may be differently interpreted depending on how the received signal has been converted into the input signal of the SNN in step S2120. As a detailed example, an output value calculated as the results of SNN learning of a signal encoded based on a rate may be interpreted based on the outputted rate of the spike. An output value calculated as the results of SNN learning of a signal encoded based on timing may be interpreted how closely to a pre-defined timing label has the output value been outputted. Alternatively, the output value may be interpreted depending on how much latency has been generated and outputted based on a pre-defined timing label. Accordingly, the output value may be interpreted depending on how quickly a spike occurs based on a timing label of each output layer node configured in the same time (or depending on how much latency has occurred until a spike is generated). An output sequence calculated as the results of SNN learning of a signal encoded based on a sequence may be interpreted depending on how must is the output sequence similar to a sequence label. That is, the output sequence may be determined based on a degree of correlation between a sequence label and an actual output sequence.

The output value may be converted into an input signal of the channel decoder (S2140). For example, the conversion into the input signal of the channel decoder may be performed based on Method 1 to Method 3. The output value of the SNN may be converted into the input signal of the channel decoder in an LLR form.

As a detailed example, an output value outputted by learning a signal converted based on a spike rate may be calculated as an LLR based on a spike rate of the SNN output layer. The calculated LLR value may be delivered to the channel decoder. In other words, a log value based on a spike counter of the output value may be calculated and converted into the input signal of the channel decoder. A value obtained by taking a log with respect to a ratio of spike counter values of each node of the SNN output layer may be delivered to the input of the channel decoder. An LLR may be calculated based on a time difference between a timing label of the SNN output layer and an output value from the output value outputted by learning a signal converted based on timing, and may be converted into an input signal of the channel decoder. An LLR may be calculated based on a degree of correlation between a sequence label of the SNN output layer and an output sequence from the output value outputted by learning a signal converted based on a sequence, and may be converted into an input signal of the channel decoder. Alternatively, an LLR may be calculated based on a time difference between a sequence label of the SNN output layer and an output sequence, and may be converted into an input signal of the channel decoder.

General Device to which the Present Disclosure May be Applied

FIG. 22 illustrates a block configuration diagram of a wireless communication device to which methods proposed in the present disclosure may be applied.

Referring to FIG. 22, a wireless communication system may include a first device 2210 and a second device 2220.

The first device 2210 may be a device related to a base station, a network node, a Tx terminal, an Rx terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 2220 may be a device related to a base station, a network node, a Tx terminal, an Rx terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the terminal may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 2210 may include at least one processor such as a processor 2211, at least one memory such as a memory 2212, and at least one transceiver such as a transceiver 2213. The processor 2211 may perform the above-described functions, procedures, and/or methods. The processor 2211 may perform one or more protocols. For example, the processor 2211 may perform one or more layers of a radio interface protocol. The memory 2212 is connected to the processor 2211, and may store various forms of information and/or instructions. The transceiver 2213 is connected to the processor 2211, and may be controlled to transmit and receive radio signals.

As a detailed example, the processor 2211 may transmit a signal modulated based on the DPSK scheme to the second device 2220 by controlling the transceiver 2213.

The second device 2220 may include at least one processor such as a processor 2221, at least one memory device such as a memory 2222, and at least one transceiver such as a transceiver 2223. The processor 2221 may perform the above-described functions, procedures and/or methods. The processor 2221 may implement one or more protocols. For example, the processor 2221 may implement one or more layers of a radio interface protocol. The memory 2222 is connected to the processor 2221, and may store various forms of information and/or instructions. The transceiver 2223 is connected to the processor 2221 and may be controlled transmit and receive radio signals.

As a detailed example, the processor 2221 may receive, from the first device 2210, a signal modulated based on the DPSK scheme through a low-bit ADC by controlling the transceiver 2223 (S2110). Furthermore, the processor 2221 may convert the received signal into an input signal for spiking neural network (SNN) learning (S2120). For example, the received signal may be converted into the input signal of the SNN based on any one of a spike rate, timing, and a sequence. Furthermore, the processor 2221 may calculate an output value by performing SNN learning based on the input signal of the SNN (S2130). Furthermore, the processor 2221 may convert the output value into the input signal of the channel decoder (S2140). For example, the conversion into the input signal of the channel decoder may be performed based on Method 1 to Method 3. The output value of the SNN may be converted into the input signal of the channel decoder in an LLR form.

FIG. 23 is another example of a block configuration diagram of a wireless communication device to which methods proposed in the present disclosure may be applied.

Referring to FIG. 23, a wireless communication system includes a base station 2310 and multiple UEs 2320 disposed within the base station region. The base station may be represented as a transmitter and the UE may be represented as a receiving device, and vice versa. The base station and the UE include processors 2311 and 2321, memories 2314 and 2324, one or more Tx/Rx RF modules (radio frequency modules) 2315 and 2325, Tx processors 2312 and 2322, Rx processors 2313 and 2323, and antennas 2316 and 2326, respectively. The processor implements the aforementioned functions, processes and/or methods. More specifically, in the DL (communication from the base station to the UE), a higher layer packet is provided from a core network to the processor 2311. The processor implements a function of an L2 layer. In the DL, the processor provides the UE 2320 with multiplexing between a logical channel and a transport channel and wireless resource allocation, and is responsible for signaling to the UE. The TX processor 2312 implements various signal processing functions for the L1 layer (i.e., physical layer). The signal processing function facilitates a forward error correction (FEC) in the UE, and includes coding and interleaving. A coded and modulated symbol is split into parallel streams. Each of the streams is mapped to an OFDM subcarrier and is multiplexed with a reference signal (RS) in a time and/or frequency region. The streams are together combined using an inverse fast Fourier transform (IFFT) to generate a physical channel that carries a time region OFDMA symbol stream. The OFDM stream is spatially precoded in order to generate a multi-spatial stream. Each spatial stream may be provided to a different antenna 2316 through an individual Tx/Rx module (or the transceiver 2315). Each Tx/Rx module may modulate an RF carrier in each spatial stream for transmission. In the UE, each Tx/Rx module (or the transceiver, 2325) receives a signal through each antenna 2326 of each Tx/Rx module. Each Tx/Rx module restores information modulated into the RF carrier and provides the information to the RX processor 2323. The Rx processor implements various signal processing functions of a layer 1. The Rx processor may perform spatial processing on information in order to recover a given spatial stream toward the UE. If multiple spatial streams are directed toward the UE, the multiple spatial streams may be combined into a single OFDMA symbol stream by multiple Rx processors. The Rx processor converts an OFDMA symbol stream from the time region to the frequency region by using a fast Fourier transform (FFT). A frequency region signal includes an individual OFDMA symbol stream for each subcarrier of an OFDM signal. Symbols on each subcarrier and a reference signal are restored and demodulated by determining the most possible signal arrangement points transmitted by the base station. Such soft decisions may be based on channel estimation values. The soft decisions are decoded and interleaved in order to restore data and a control signal originally transmitted by the base station on the physical channel. The corresponding data and control signal are provided to the processor 2321.

An UL (communication from the UE to the base station) is processed in the base station 2310 by a method similar to that described in relation to a receiver function in the UE 2320. Each Tx/Rx module 2325 receives a signal through each antenna 2326. Each Tx/Rx module provides an RF carrier and information to the Rx processor 2323. The processor 2321 may be related to the memory 2324 which stores a program code and data. The memory may be denoted as a computer-readable medium.

FIG. 24 illustrates an AI device 2400 according to an embodiment of the disclosure.

The AI device 2400 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 24, the terminal 2400 may include a communication unit 2410, an input unit 2420, a learning processor 2430, a sensing unit 2440, an output unit 2450, a memory 2470 and a processor 2480.

The communication unit 2410 may transmit and receive data to and from external devices, such as other AI devices 2600a to 2600e or an AI server 2500, using wired and wireless communication technologies. For example, the communication unit 2410 may transmit and receive sensor information, a user input, a learning model, and a control signal to and from external devices.

In this case, communication technologies used by the communication unit 2410 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 2420 may obtain various types of data.

In this case, the input unit 2420 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 2420 may obtain learning data for model learning and input data to be used when an output is obtained using a learning model. The input unit 2420 may obtain not-processed input data. In this case, the processor 2480 or the learning processor 2430 may extract an input feature by performing pre-processing on the input data.

The learning processor 2430 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 2430 may perform AI processing along with the learning processor 2540 of the AI server 2500.

In this case, the learning processor 2430 may include memory integrated or implemented in the AI device 2400. Alternatively, the learning processor 2430 may be implemented using the memory 2470, external memory directly coupled to the AI device 2400 or memory maintained in an external device.

The sensing unit 2440 may obtain at least one of internal information of the AI device 2400, surrounding environment information of the AI device 2400, or user information using various sensors.

In this case, sensors included in the sensing unit 2440 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 2450 may generate an output related to a visual sense, an auditory sense or a tactile sense.

In this case, the output unit 2450 may include a display unit for outputting visual information, a speaker for outputting auditory information, and a haptic module for outputting tactile information.

The memory 2470 may store data supporting various functions of the AI device 2400. For example, the memory 2470 may store input data obtained by the input unit 2420, learning data, a learning model, a learning history, etc.

The processor 2480 may determine at least one executable operation of the AI device 2400 based on information, determined or generated using a data analysis algorithm or a machine learning algorithm. Furthermore, the processor 2480 may perform the determined operation by controlling elements of the AI device 2400.

To this end, the processor 2480 may request, search, receive, and use the data of the learning processor 2430 or the memory 2470, and may control elements of the AI device 2400 to execute a predicted operation or an operation determined to be preferred, among the at least one executable operation.

In this case, if association with an external device is necessary to perform the determined operation, the processor 2480 may generate a control signal for controlling the corresponding external device and transmit the generated control signal to the corresponding external device.

The processor 2480 may obtain intention information for a user input and transmit user requirements based on the obtained intention information.

In this case, the processor 2480 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 2430, may have been trained by the learning processor 2540 of the AI server 2500 or may have been trained by distributed processing thereof.

The processor 2480 may collect history information including the operation contents of the AI device 2400 or the feedback of a user for an operation, may store the history information in the memory 2470 or the learning processor 2430, or may transmit the history information to an external device, such as the AI server 2500. The collected history information may be used to update a learning model.

The processor 2480 may control at least some of the elements of the AI device 2400 in order to execute an application program stored in the memory 2470. Moreover, the processor 2480 may combine and drive two or more of the elements included in the AI device 2400 in order to execute the application program.

FIG. 25 illustrates an AI server 2500 according to an embodiment of the disclosure.

Referring to FIG. 25, the AI server 2500 may mean a device which is trained by an artificial neural network using a machine learning algorithm or which uses a trained artificial neural network. In this case, the AI server 2500 is configured with a plurality of servers and may perform distributed processing and may be defined as a 5G network. In this case, the AI server 2500 may be included as a partial configuration of the AI device 2400, and may perform at least some of AI processing.

The AI server 2500 may include a communication unit 2510, a memory 2530, a learning processor 2540 and a processor 260.

The communication unit 2510 may transmit and receive data to and from an external device, such as the AI device 2400.

The memory 2530 may include a model storage unit 2531. The model storage unit 2531 may store a model (or artificial neural network 2531a) which is being trained or has been trained through the learning processor 2540.

The learning processor 2540 may train the artificial neural network 2531a using learning data. The learning model may be used in the state in which it has been mounted on the AI server 2500 of the artificial neural network or may be mounted on an external device, such as the AI device 2400, and used.

The learning model may be implemented as hardware, software or a combination of hardware and software. If some of or the entire learning model is implemented as software, one or more instructions configuring the learning model may be stored in the memory 2530.

The processor 2560 may deduce a result value of new input data using the learning model, and may generate a response or control command based on the deduced result value.

FIG. 26 illustrates an AI system 2600 according to an embodiment of the disclosure.

Referring to FIG. 26, the AI system 2600 is connected to at least one of the AI server 2500, a robot 2600a, a self-driving vehicle 2600b, an XR device 2600c, a smartphone 2600d or home appliances 2600e over a cloud network 2610. In this case, the robot 2600a, the self-driving vehicle 2600b, the XR device 2600c, the smartphone 2600d or the home appliances 2600e to which the AI technology has been applied may be called AI devices 2600a to 2600e.

The cloud network 2610 may configure part of cloud computing infra or may mean a network present within cloud computing infra. In this case, the cloud network 2610 may be configured using the 3G network, the 4G or long term evolution (LTE) network or the 5G network.

That is, the devices 2600a to 2600e (200) configuring the AI system 2600 may be interconnected over the cloud network 2610. Particularly, the devices 2600a to 2600e and 200 may communicate with each other through a base station, but may directly communicate with each other without the intervention of a base station.

The AI server 2500 may include a server for performing AI processing and a server for performing calculation on big data.

The AI server 2500 is connected to at least one of the robot 2600a, the self-driving vehicle 2600b, the XR device 2600c, the smartphone 2600d or the home appliances 2600e, that is, AI devices configuring the AI system 2600, over the cloud network 2610, and may help at least some of the AI processing of the connected AI devices 2600*a* to 2600*e*.

In this case, the AI server 2500 may train an artificial neural network based on a machine learning algorithm in place of the AI devices 2600*a* to 2600*e*, may directly store a learning model or may transmit the learning model to the AI devices 2600*a* to 2600*e*.

In this case, the AI server 2500 may receive input data from the AI devices 2600*a* to 2600*e*, may deduce a result value of the received input data using the learning model, may generate a response or control command based on the deduced result value, and may transmit the response or control command to the AI devices 2600*a* to 2600*e*.

Alternatively, the AI devices 2600*a* to 2600*e* may directly deduce a result value of input data using a learning model, and may generate a response or control command based on the deduced result value.

Hereinafter, various embodiments of the AI devices 2600*a* to 2600*e* to which the above-described technology is applied are described. In this case, the AI devices 2600*a* to 2600*e* shown in FIG. 26 may be considered to be detailed embodiments of the AI device 2400 shown in FIG. 24.

<AI+Robot>

An AI technology is applied to the robot 2600*a*, and the robot 2600*a* may be implemented as a guidance robot, a transport robot, a cleaning robot, a wearable robot, an entertainment robot, a pet robot, an unmanned flight robot, etc.

The robot 2600*a* may include a robot control module for controlling an operation. The robot control module may mean a software module or a chip in which a software module has been implemented using hardware.

The robot 2600*a* may obtain state information of the robot 2600*a*, may detect (recognize) a surrounding environment and object, may generate map data, may determine a moving path and a running plan, may determine a response to a user interaction, or may determine an operation using sensor information obtained from various types of sensors.

In this case, the robot 2600*a* may use sensor information obtained by at least one sensor among LIDAR, a radar, and a camera in order to determine the moving path and running plan.

The robot 2600*a* may perform the above operations using a learning model configured with at least one artificial neural network. For example, the robot 2600*a* may recognize a surrounding environment and object using a learning model, and may determine an operation using recognized surrounding environment information or object information. In this case, the learning model may have been directly trained in the robot 2600*a* or may have been trained in an external device, such as the AI server 2500.

In this case, the robot 2600*a* may directly generate results using the learning model and perform an operation, but may perform an operation by transmitting sensor information to an external device, such as the AI server 2500, and receiving results generated in response thereto.

The robot 2600*a* may determine a moving path and running plan using at least one of map data, object information detected from sensor information, or object information obtained from an external device. The robot 2600*a* may run along the determined moving path and running plan by controlling the driving unit.

The map data may include object identification information for various objects disposed in the space in which the robot 2600*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 2600*a* may perform an operation or run by controlling the driving unit based on a user's control/interaction. In this case, the robot 2600*a* may obtain intention information of an interaction according to a user's behavior or voice speaking, may determine a response based on the obtained intention information, and may perform an operation.

<AI+Self-Driving>

An AI technology is applied to the self-driving vehicle 2600*b*, and the self-driving vehicle 2600*b* may be implemented as a movable type robot, a vehicle, an unmanned flight body, etc.

The self-driving vehicle 2600*b* may include a self-driving control module for controlling a self-driving function. The self-driving control module may mean a software module or a chip in which a software module has been implemented using hardware. The self-driving control module may be included in the self-driving vehicle 2600*b* as an element of the self-driving vehicle 2600*b*, but may be configured as separate hardware outside the self-driving vehicle 2600*b* and connected to the self-driving vehicle 2600*b*.

The self-driving vehicle 2600*b* may obtain state information of the self-driving vehicle 2600*b*, may detect (recognize) a surrounding environment and object, may generate map data, may determine a moving path and running plan, or may determine an operation using sensor information obtained from various types of sensors.

In this case, in order to determine the moving path and running plan, like the robot 2600*a*, the self-driving vehicle 2600*b* may use sensor information obtained from at least one sensor among LIDAR, a radar and a camera.

Particularly, the self-driving vehicle 2600*b* may recognize an environment or object in an area whose view is blocked or an area of a given distance or more by receiving sensor information for the environment or object from external devices, or may directly receive recognized information for the environment or object from external devices.

The self-driving vehicle 2600*b* may perform the above operations using a learning model configured with at least one artificial neural network. For example, the self-driving vehicle 2600*b* may recognize a surrounding environment and object using a learning model, and may determine the flow of running using recognized surrounding environment information or object information. In this case, the learning model may have been directly trained in the self-driving vehicle 2600*b* or may have been trained in an external device, such as the AI server 2500.

In this case, the self-driving vehicle 2600*b* may directly generate results using the learning model and perform an operation, but may perform an operation by transmitting sensor information to an external device, such as the AI server 2500, and receiving results generated in response thereto.

The self-driving vehicle 2600*b* may determine a moving path and running plan using at least one of map data, object information detected from sensor information or object information obtained from an external device. The self-driving vehicle 2600*b* may run based on the determined moving path and running plan by controlling the driving unit.

The map data may include object identification information for various objects disposed in the space (e.g., road) in which the self-driving vehicle 2600*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 2600b may perform an operation or may run by controlling the driving unit based on a user's control/interaction. In this case, the self-driving vehicle 2600b may obtain intention information of an interaction according to a user' behavior or voice speaking, may determine a response based on the obtained intention information, and may perform an operation.

<AI+XR>

An AI technology is applied to the XR device 2600c, and the XR device 2600c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 2600c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 2600c may output an XR object, including additional information for a recognized object, by making the XR object correspond to the corresponding recognized object.

The XR device 2600c may perform the above operations using a learning model configured with at least one artificial neural network. For example, the XR device 2600c may recognize a real object in three-dimensional point cloud data or image data using a learning model, and may provide information corresponding to the recognized real object. In this case, the learning model may have been directly trained in the XR device 2600c or may have been trained in an external device, such as the AI server 2500.

In this case, the XR device 2600c may directly generate results using a learning model and perform an operation, but may perform an operation by transmitting sensor information to an external device, such as the AI server 2500, and receiving results generated in response thereto.

<AI+Robot+Self-Driving>

An AI technology and a self-driving technology are applied to the robot 2600a, and the robot 2600a may be implemented as a guidance robot, a transport robot, a cleaning robot, a wearable robot, an entertainment robot, a pet robot, an unmanned flight robot, etc.

The robot 2600a to which the AI technology and the self-driving technology have been applied may mean a robot itself having a self-driving function or may mean the robot 2600a interacting with the self-driving vehicle 2600b.

The robot 2600a having the self-driving function may collectively refer to devices that autonomously move along a given flow without control of a user or autonomously determine a flow and move.

The robot 2600a and the self-driving vehicle 2600b having the self-driving function may use a common sensing method in order to determine one or more of a moving path or a running plan. For example, the robot 2600a and the self-driving vehicle 2600b having the self-driving function may determine one or more of a moving path or a running plan using information sensed through LIDAR, a radar, a camera, etc.

The robot 2600a interacting with the self-driving vehicle 2600b is present separately from the self-driving vehicle 2600b, and may perform an operation associated with a self-driving function inside or outside the self-driving vehicle 2600b or associated with a user got in the self-driving vehicle 2600b.

In this case, the robot 2600a interacting with the self-driving vehicle 2600b may control or assist the self-driving function of the self-driving vehicle 2600b by obtaining sensor information in place of the self-driving vehicle 2600b and providing the sensor information to the self-driving vehicle 2600b, or by obtaining sensor information, generating surrounding environment information or object information, and providing the surrounding environment information or object information to the self-driving vehicle 2600b.

Alternatively, the robot 2600a interacting with the self-driving vehicle 2600b may control the function of the self-driving vehicle 2600b by monitoring a user got in the self-driving vehicle 2600b or through an interaction with a user. For example, if a driver is determined to be a drowsiness state, the robot 2600a may activate the self-driving function of the self-driving vehicle 2600b or assist control of the driving unit of the self-driving vehicle 2600b. In this case, the function of the self-driving vehicle 2600b controlled by the robot 2600a may include a function provided by a navigation system or audio system provided within the self-driving vehicle 2600b, in addition to a self-driving function simply.

Alternatively, the robot 2600a interacting with the self-driving vehicle 2600b may provide information to the self-driving vehicle 2600b or may assist a function outside the self-driving vehicle 2600b. For example, the robot 2600a may provide the self-driving vehicle 2600b with traffic information, including signal information, as in a smart traffic light, and may automatically connect an electric charger to a filling inlet through an interaction with the self-driving vehicle 2600b as in the automatic electric charger of an electric vehicle.

<AI+Robot+XR>

An AI technology and an XR technology are applied to the robot 2600a, and the robot 2600a may be implemented as a guidance robot, a transport robot, a cleaning robot, a wearable robot, an entertainment robot, a pet robot, an unmanned flight robot, a drone, etc.

The robot 2600a to which the XR technology has been applied may mean a robot, that is, a target of control/interaction within an XR image. In this case, the robot 2600a is different from the XR device 2600c, and they may operate in conjunction with each other.

When the robot 2600a, that is, a target of control/interaction within an XR image, obtains sensor information from sensors including a camera, the robot 2600a or the XR device 2600c may generate an XR image based on the sensor information, and the XR device 2600c may output the generated XR image. Furthermore, the robot 2600a may operate based on a control signal received through the XR device 2600c or a user's interaction.

For example, a user may identify a corresponding XR image at timing of the robot 2600a, remotely operating in conjunction through an external device, such as the XR device 2600c, may adjust the self-driving path of the robot 2600a through an interaction, may control an operation or driving, or may identify information of a surrounding object.

<AI+Self-Driving+XR>

An AI technology and an XR technology are applied to the self-driving vehicle 2600b, and the self-driving vehicle 2600b may be implemented as a movable type robot, a vehicle, an unmanned flight body, etc.

The self-driving vehicle 2600b to which the XR technology has been applied may mean a self-driving vehicle equipped with means for providing an XR image or a self-driving vehicle, that is, a target of control/interaction within an XR image. Particularly, the self-driving vehicle 2600b, that is, a target of control/interaction within an XR image, is different from the XR device 2600c, and they may operate in conjunction with each other.

The self-driving vehicle 2600b equipped with the means for providing an XR image may obtain sensor information from sensors including a camera, and may output an XR image generated based on the obtained sensor information. For example, the self-driving vehicle 2600b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 2600b, at least some of the XR object may be output so that it overlaps an object within a screen. For example, the self-driving vehicle 2600b may output XR objects corresponding to objects, such as a carriageway, another vehicle, a traffic light, a signpost, a two-wheeled vehicle, a pedestrian, and a building.

When the self-driving vehicle 2600b, that is, a target of control/interaction within an XR image, obtains sensor information from sensors including a camera, the self-driving vehicle 2600b or the XR device 2600c may generate an XR image based on the sensor information. The XR device 2600c may output the generated XR image. Furthermore, the self-driving vehicle 2600b may operate based on a control signal received through an external device, such as the XR device 2600c, or a user's interaction.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving signal in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method of a receiving device to receive signals in a wireless communication system, the method comprising:
receiving a signal modulated based on a differential phase shift keying (DPSK) scheme, from a transmitter;
converting the received signal into a first input signal of a spike neural network (SNN);
obtaining an output value through the SNN;
converting the output value into a second input signal of a channel decoder; and
providing the second input signal to the channel decoder, and
wherein the received signal is converted into the first input signal of the SNN based on at least one of a spike rate, a spike timing, or a spike sequence, and
wherein based on the received signal being converted based on the spike timing, a log-likelihood ratio (LLR) value is obtained from the output value based on a time difference between the output value and a time label and is converted into the second input signal of the channel decoder.

2. The method of claim 1,
wherein the first input signal of the SNN and an input layer of the SNN are one-to-one mapped for each other.

3. The method of claim 1,
wherein based on the received signal being converted based on the spike rate, a log value is obtained based on a spike counter of the output value and is converted into the second input signal of the channel decoder.

4. The method of claim 1,
wherein based on the received signal being converted based on the spike sequence, the sequence is generated by converting a Costas array into a one-dimensional sequence based on a row or column.

5. The method of claim 4,
wherein based on the received signal being converted based on the spike sequence, the LLR value is obtained from the output value based on a degree of correlation between a sequence label and a sequence of the output value and converted into the second input signal of the channel decoder.

6. The method of claim 4,
wherein based on the received signal being converted based on the spike sequence the LLR value is obtained from the output value based on a time difference between a sequence label and a sequence of the output value and converted into the second input signal of the channel decoder.

7. The method of claim 1,
wherein the second input signal of the channel decoder corresponds to the LLR value.

8. The method of claim 1,
wherein the received signal corresponds to a signal quantized to 1 to 3 bits.

9. A device of receiving signals in a wireless communication system, the device comprising:
a receiver;
at least one processor; and
at least one computer memory operably connectable to the at least one processor and storing instructions that, when executed by the at least one processor, perform operations comprising:
receiving a signal modulated based on a differential phase shift keying (DPSK) scheme, from a transmitter;
converting the received signal into a first input signal of a spike neural network (SNN);
obtaining an output value through the SNN;
converting the output value into a second input signal of a channel decoder; and
providing the second input signal to the channel decoder, and
wherein the received signal is converted into the first input signal of the SNN based on at least one of a spike rate, spike timing, or a spike sequence, and
wherein based on the received signal being converted based on the spike timing, a log-likelihood ratio (LLR) value is obtained from the output value based on a time difference between the output value and a time label and is converted into the second input signal of the channel decoder.

10. The device of claim 9,
wherein the second input signal of the channel decoder corresponds to the LLR value.

11. The device of claim 9,
wherein the received signal corresponds to a signal quantized to 1 to 3 bits.

* * * * *